(12) United States Patent
Yamakawa et al.

(10) Patent No.: US 7,651,802 B2
(45) Date of Patent: Jan. 26, 2010

(54) SOLID POLYMER ELECTROLYTE, PROTON CONDUCTIVE MEMBRANE, ELECTRODE ELECTROLYTE, ELECTRODE PASTE AND MEMBRANE-ELECTRODE ASSEMBLY

(75) Inventors: Yoshitaka Yamakawa, Tokyo (JP); Toshihiro Ohtsuki, Tokyo (JP); Kohei Goto, Tokyo (JP); Toshiaki Kadota, Tokyo (JP); Teruhiko Umehara, Tokyo (JP); Nagayuki Kanaoka, Wako (JP); Masaru Iguchi, Wako (JP); Hiroshi Sohma, Wako (JP)

(73) Assignees: JSR Corporation, Tokyo (JP); Honda Motor Co., Ltd., Tokyo (JP)

( * ) Notice: Subject to any disclaimer, the term of this patent is extended or adjusted under 35 U.S.C. 154(b) by 570 days.

(21) Appl. No.: 11/375,141

(22) Filed: Mar. 15, 2006

(65) Prior Publication Data
US 2006/0216566 A1   Sep. 28, 2006

(30) Foreign Application Priority Data
Mar. 22, 2005  (JP)  .............................. 2005-081667

(51) Int. Cl.
*H01M 8/10*  (2006.01)
*C08J 5/20*  (2006.01)
*C08G 65/34*  (2006.01)

(52) U.S. Cl. .............................. 429/33; 429/30; 521/25; 521/27; 528/425

(58) Field of Classification Search .................. 429/30, 429/33; 521/25, 27; 528/425
See application file for complete search history.

(56) References Cited

U.S. PATENT DOCUMENTS
5,403,675 A   4/1995   Ogata et al.

OTHER PUBLICATIONS

Takeshi Kobayashi et al., "Preparation of Thermally Stable Proton Conducting Polymer (V)", Polymer Preprints, Preprints, Japan, 1994, pp. 736, vol. 43, No. 3. (with English Edition on p. 441).
Takeshi Kobayashi et al., "Preparation of Thermally Stable Proton Conducting Polymer", Polymer Preprints, Japan, 1993, pp. 730, vol. 42, No. 3. (with English Edition on p. 295).
Takeshi Kobayashi et al., "Preparation of Thermally Stable Proton Conducting Polymer (II)", Polymer Preprints, Japan, 1993, pp. 2490-2492, vol. 42, No. 7. (with English Edition on p. 928).

*Primary Examiner*—Duc Truong
(74) *Attorney, Agent, or Firm*—Arent Fox LLP

(57) ABSTRACT

Disclosed is a polymer electrolyte having a protonic acid group that is excellent in thermal stability and dimensional stability. The polymer electrolyte includes copolymers having a sulfonic acid group which has a structure represented by the following formula:

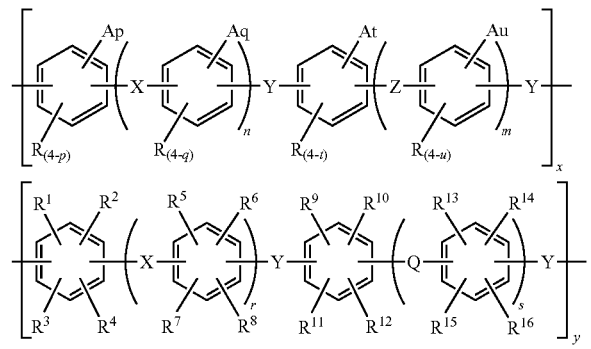

wherein X is a divalent electron-withdrawing group; Y is an oxygen or a sulfur; Z and Q are each a direct bond, —O—, —S—, —CO—, —SO$_2$—, —[C(R')$_2$]$_g$— (g: integer of from 1 to 8), etc.; R, R' and R$^1$ to R$^{16}$ are each a hydrogen, a fluorine, an alkyl, a fluorine-substituted alkyl, an aryl or a nitrile; m, n, p, q, r, s, t and u are each an integer of from 0 to 4 (with the proviso that p+q≧1); and A is a group represented by Formula (5a) or (5b) below:

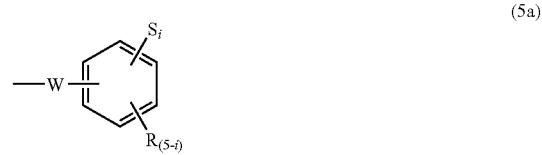

(5a)

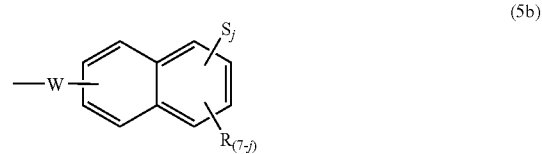

(5b)

wherein W is a divalent electron-withdrawing group; S is a protonic acid group; i is an integer of from 1 to 5; and j is an integer of from 1 to 7.

9 Claims, No Drawings

SOLID POLYMER ELECTROLYTE, PROTON CONDUCTIVE MEMBRANE, ELECTRODE ELECTROLYTE, ELECTRODE PASTE AND MEMBRANE-ELECTRODE ASSEMBLY

FIELD OF THE INVENTION

The present invention relates to a polymer electrolyte that includes constituent units with a protonic acid group and constituent units without a protonic acid group. More particularly, the invention relates to a solid polymer electrolyte suitable as electrolyte membranes and the like used for example in fuel cells, water electrolysis, hydrohalic acid electrolysis, brine electrolysis, oxygen concentrators, humidity sensors and gas sensors, and relates to a proton conductive membrane, an electrode electrolyte, an electrode paste and a membrane-electrode assembly that each include the polymer electrolyte.

DESCRIPTION OF THE RELATED ART

Polymer electrolytes are polymeric materials that have protonic acid groups such as sulfonic acid groups in the polymer chains. The polymer electrolytes possess characteristics such that they bond firmly to specific ions and selectively pass cations or anions, and are used in widespread applications in the form of particles, fibers and membranes.

As an example, solid polymer fuel cells are made up of a proton conductive polymer electrolyte membrane (proton conductive membrane) sandwiched between a pair of electrodes. They can produce electrical energy directly from chemical energy generated when a hydrogen-containing fuel gas such as reformed gas is supplied to one of the electrodes (fuel electrode) and an oxygen-containing oxidant gas such as air is fed to the other electrode (air electrode), with the fuel being oxidized.

It is known that the solid polymer fuel cells show higher power generation efficiency as the cell operating temperature increases. The electrodes on both surfaces of the proton conductive membrane contain a platinum electrode catalyst. Platinum is poisoned with carbon monoxide even in trace amounts and the poisoning can cause lowering in fuel cell output. The poisoning of the platinum electrode catalyst with carbon monoxide is known to be remarkable at lower temperatures. The solid polymer fuel cells run on fuel gases which contain trace amounts of carbon monoxide, such as methanol reformed gas, and are therefore desired to operate at high temperatures for improving the power generation efficiency and for reducing the poisoning of the electrode catalyst with carbon monoxide.

However, the polymer electrolytes change dimension under high temperature and humidified conditions; further, perfluoro electrolytes represented by Nafion® (manufactured by Du Pont Kabushiki Kaisha) known as proton conductive polymer electrolytes are uncrosslinked and low in heat resistance, and therefore cannot be used at high temperatures.

Research for improving high temperature durability has led to the development of polymer electrolytes by introducing sulfonic acid groups and the like in polymers such as aromatic polyarylene ether ketones and aromatic polyarylene ether sulfones (for example, U.S. Pat. No. 5,403,675; Polymer Preprints, Japan, Vol. 42, No. 3, P. 730 (1993); Polymer Preprints, Japan, Vol. 42, No. 7, PP. 2490-2492 (1993); and Polymer Preprints, Japan, Vol. 43, No. 3, PP. 735-736 (1994))).

However, such polymer electrolytes generally have high water absorption and swelling under high temperature and humidified conditions, and are consequently unsatisfactory in dimensional stability. Further, if the sulfonic acid concentration is lowered in an attempt to prevent swelling, the proton conductivity is remarkably reduced. Moreover, continuous use at high temperatures results in elimination or decomposition of the sulfonic acid groups and consequent poor durability.

SUMMARY OF THE INVENTION

It is an object of the present invention to provide a polymer electrolyte having a protonic acid group that is excellent in dimensional stability even under high temperature and humidified conditions and in thermal stability. Another object of the invention is to provide a proton conductive membrane, an electrode electrolyte, an electrode paste and a membrane-electrode assembly that each include the polymer electrolyte.

The present inventors studied diligently in view of the problems in the background art, and have achieved the above objects by finding a polymer electrolyte that contains a copolymer including constituent units of specific structure with a protonic acid group and constituent units of specific structure without a protonic acid group.

The polymer electrolyte according to the present invention comprises a copolymer comprising constituent units with a protonic acid group represented by Formula (1) below and constituent units without a protonic acid group represented by Formula (6) below:

(1)

wherein $Ar^1$ is a binding unit represented by Formula (2) below; $Ar^2$ is a binding unit represented by Formula (3) below; and Y is an oxygen or a sulfur atom;

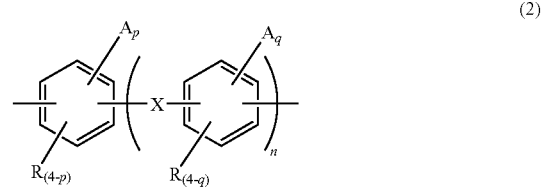

(2)

wherein X is a divalent electron-withdrawing group; n is an integer of from 0 to 4; p and q are each an integer of from 0 to 4 (with the proviso that $p+q \geq 1$); Rs are each a hydrogen atom, a fluorine atom, an alkyl group, a fluorine-substituted alkyl group, an aryl group or a nitrile group; and As are each a group represented by Formula (5a) or (5b) below;

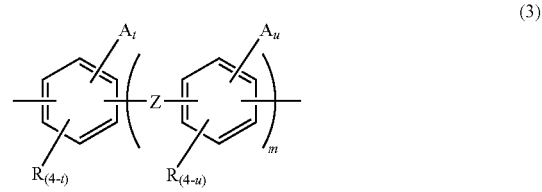

(3)

wherein Z is a direct bond, —O—, —S—, —CO—, —$SO_2$—, —$[C(R')_2]_g$— (wherein R' is a hydrogen atom, a fluorine atom, an alkyl group, a fluorine-substituted alkyl group or an aryl group, and g is an integer of from 1 to 8) or a binding unit represented by any of Formulae (4a) to (4d)

below; m is an integer of from 0 to 4; t and u are each an integer of from 0 to 4; and Rs and As are as defined in Formula (2);

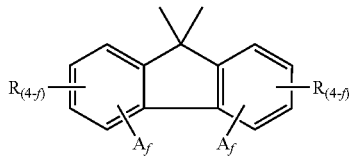
(4a)

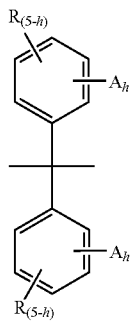
(4b)

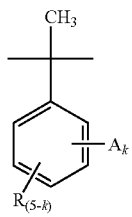
(4c)

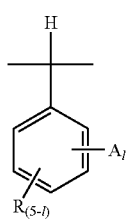
(4d)

wherein f is an integer of from 0 to 4; h, k and l are each an integer of from 0 to 5; and Rs and As are as defined in Formula (2);

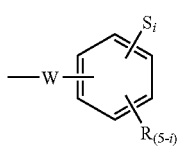
(5a)

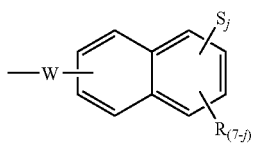
(5b)

wherein W is a divalent electron-withdrawing group; S is a protonic acid group; i is an integer of from 1 to 5; j is an integer of from 1 to 7; and Rs are as defined in Formula (2);

—(Ar$^3$—Y—Ar$^4$—Y)— (6)

wherein Ar$^3$ is a binding unit represented by Formula (7) below; Ar$^4$ is a binding unit represented by Formula (8) below; and Y is an oxygen or a sulfur atom;

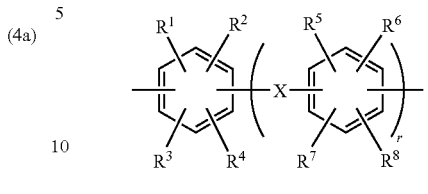
(7)

wherein X is a divalent electron-withdrawing group; r is an integer of from 0 to 4; and R$^1$ to R$^8$ are the same or different from one another and are each a hydrogen atom, a fluorine atom, an alkyl group, a fluorine-substituted alkyl group, an aryl group or a nitrile group;

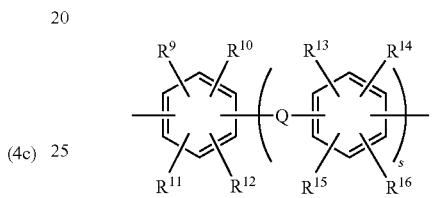
(8)

wherein Q is a direct bond, —O—, —S—, —CO—, —SO$_2$—, —[C(R')$_2$]$_g$— (wherein R' is a hydrogen atom, a fluorine atom, an alkyl group, a fluorine-substituted alkyl group or an aryl group, and g is an integer of from 1 to 8) or a binding unit represented by any of Formulae (9a) to (9d) below; s is an integer of from 0 to 4; and R$^9$ to R$^{16}$ are the same or different from one another and are each a hydrogen atom, a fluorine atom, an alkyl group, a fluorine-substituted alkyl group, an aryl group or a nitrile group;

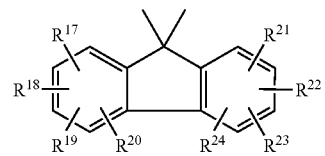
(9a)

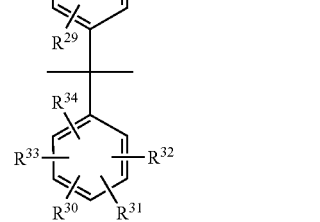
(9b)

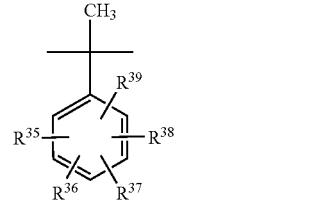
(9c)

-continued (9d)

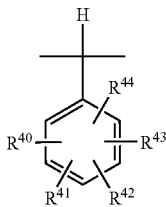

wherein $R^{17}$ to $R^{44}$ are the same or different from one another and are each a hydrogen atom, a fluorine atom, an alkyl group, a fluorine-substituted alkyl group, an aryl group or a nitrile group.

The copolymer is preferably a block copolymer that comprises at least one each of a block which comprises the constituent units with a protonic acid group represented by Formula (1) and a block which comprises the constituent units without a protonic acid group represented by Formula (6).

Preferably, X in Formulae (2) and (7) is —CO—, —SO$_2$— or —[C(R")$_2$]$_g$—, and W in Formulae (5a) and (5b) is —CO—, —SO$_2$— or —[C(R")$_2$]$_g$— (wherein R" is a fluorine atom or a fluorine-substituted alkyl group, and g is an integer of from 1 to 8).

Preferably, the constituent unit represented by Formula (1) is represented by any of Formulae (18) to (21) below:

(18)

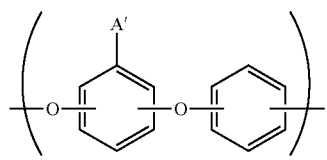

(19)

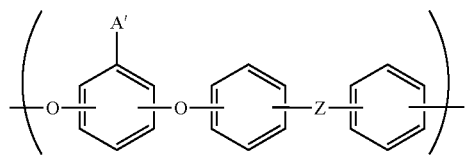

(20)

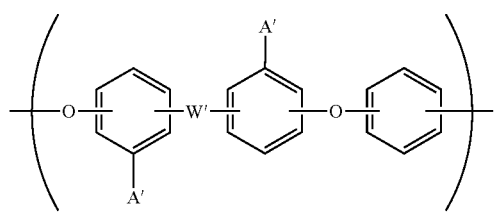

(21)

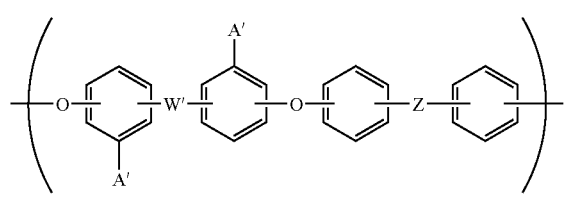

wherein W' is —CO— or —SO$_2$—; A' is a group represented by any of Formulae (22a) to (22c) below;

(22a)

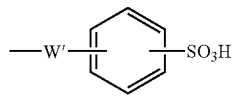

-continued (22b)

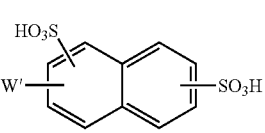

(22c)

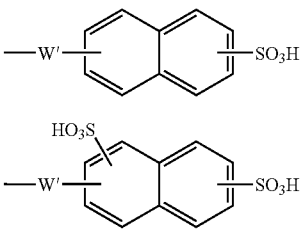

wherein W' is —CO— or —SO$_2$—.

Preferably, the constituent unit represented by Formula (6) is represented by any of Formulae (10) to (12) below:

(10)

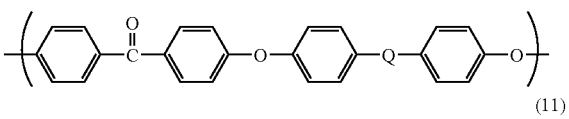

(11)

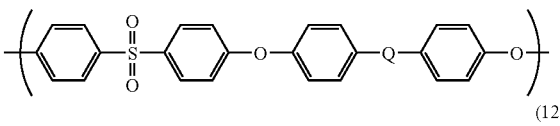

(12)

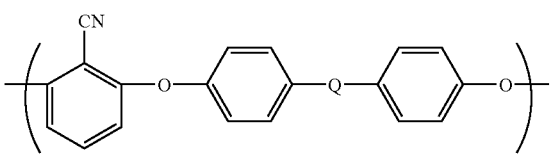

wherein Q is as defined in Formula (8).

The proton conductive membrane according to the present invention comprises the above polymer electrolyte. The electrode electrolyte of the invention comprises the above polymer electrolyte. The electrode paste according to the invention comprises the electrode electrolyte, catalyst-supporting carbon and a solvent.

The membrane-electrode assembly of the present invention comprises a proton conductive membrane and electrode layers, the proton conductive membrane and/or electrode layers comprising the polymer electrolyte.

The polymer electrolyte according to the present invention has low water absorption even under high temperature and humidified conditions and is therefore excellent in dimensional stability, and is also excellent in thermal stability. The membrane-electrode assembly in which the proton conductive membrane and/or electrodes include the polymer electrolyte can provide fuel cells that can be used even at high temperatures, and consequently the fuel consumption and power generation efficiency of the fuel cells are improved.

DESCRIPTION OF THE PREFERRED EMBODIMENTS

The polymer electrolyte of the invention and the proton conductive membrane, electrode electrolyte, electrode paste and membrane-electrode assembly which each include the polymer electrolyte will be hereinafter described in detail.

[Polymer Electrolyte]

The polymer electrolyte according to the present invention comprises a copolymer comprising constituent units with a protonic acid group represented by Formula (1) (hereinafter the constituent units (1)) and constituent units without a protonic acid group represented by Formula (6) (hereinafter the constituent units (6)).

<Copolymer Structure>

In the constituent unit (1), $Ar^1$ and $Ar^2$ are binding units represented by Formulae (2) and (3), respectively. In the constituent unit (6), $Ar^3$ and $Ar^4$ are binding units represented by Formulae (7) and (8), respectively.

In Formulae (2) and (7), X is a divalent electron-withdrawing group. Examples thereof include —CO—, —SO$_2$—, —SO—, —CONH—, —SO$_2$NH—, —SO$_2$NHSO$_2$—, —COO— and —[C(R")$_2$]$_g$— (wherein R" is a fluorine atom or a fluorine-substituted alkyl group, and g is an integer of from 1 to 8), of which —CO—, —SO$_2$— and —[C(R")$_2$]$_g$— are preferred.

In Formula (3), Z is a direct bond, —O—, —S—, —CO—, —SO$_2$—, —[C(R')$_2$]$_g$— (wherein R' is a hydrogen atom, a fluorine atom, an alkyl group, a fluorine-substituted alkyl group or an aryl group, and g is an integer of from 1 to 8) or a binding unit represented by any of Formulae (4a) to (4d), of which —CO—, —SO$_2$—, —O— and —[C(R')$_2$]$_g$— are preferred.

In Formulae (2), (3), (4a)-(4d), (5a) and (5b), R is a hydrogen atom, a fluorine atom, an alkyl group, a fluorine-substituted alkyl group, an aryl group or a nitrile group, and a plurality of Rs may be the same or different from one another. The alkyl groups include methyl, ethyl, propyl, butyl, amyl and hexyl, with methyl and ethyl being preferred. The fluorine-substituted alkyl groups include trifluoromethyl, perfluoroethyl, perfluoropropyl, perfluorobutyl, perfluoropentyl and perfluorohexyl, with trifluoromethyl and perfluoroethyl being preferred. The aryl groups include phenyl and pentafluorophenyl.

In Formulae (2), (3) and (4a)-(4d), A is a group with a protonic acid group represented by Formula (5a) or (5b).

In Formulae (5a) and (5b), W is a divalent electron-withdrawing group. Examples thereof include —CO—, —SO$_2$—, —SO—, —CONH—, —SO$_2$NH—, —SO$_2$NHSO$_2$—, —COO— and —[C(R")$_2$]$_g$— (wherein R" is a fluorine atom or a fluorine-substituted alkyl group, and g is an integer of from 1 to 8), of which —CO—, —SO$_2$— and —[C(R")$_2$]$_g$— are preferred.

In Formulae (5a) and (5b), S is a protonic acid group. Examples thereof include carboxylic acid, phosphonic acid, sulfonic acid, sulfonylimide, perfluoroalkylenesulfonic acid and perfluorophenylenesulfonic acid, of which sulfonic acid is particularly preferred.

In Formula (8), Q is a direct bond, —O—, —S—, —CO—, —SO$_2$—, —[C(R')$_2$]$_g$— (wherein R' is a hydrogen atom, a fluorine atom, an alkyl group, a fluorine-substituted alkyl group or an aryl group, and g is an integer of from 1 to 8) or a binding unit represented by any of Formulae (9a) to (9d), of which —CO—, —SO$_2$— and —[C(R')$_2$]$_g$— are preferred.

In Formulae (7), (8) and (9a)-(9d), $R^1$ to $R^{44}$ are the same or different from one another and are each a hydrogen atom, a fluorine atom, an alkyl group, a fluorine-substituted alkyl group, an aryl group or a nitrile group, with specific examples including those mentioned for R above.

The polymer electrolyte according to the present invention comprises a copolymer that has a structure of Formula (13) below comprising the constituent units (1) and (6).

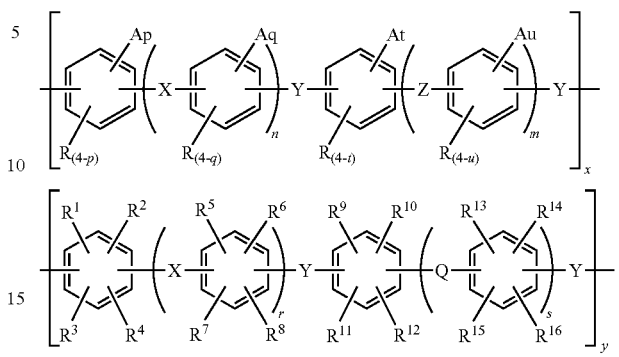

wherein X, Y, Z, Q, A, R, $R^1$ to $R^8$, p, q, t, u, m, n, r and s are as defined in Formulae (2), (3), (7) and (8), and x and y each indicate mol % of which the total (x+y) is 100 mol %.

The copolymer constituting the polymer electrolyte contains 0.5-99.999 mol %, preferably 10-99.99 mol % the constituent units (1), and 99.5-0.001 mol %, preferably 90-0.01 mol % the constituent units (6).

The copolymer may be a random or a block copolymer of the constituent units (1) and (6). From the viewpoints of hot water resistance and dimensional stability under high temperature and humidified conditions of the polymer electrolyte, the copolymer is preferably a block copolymer that includes at least one each of a block comprising the constituent units (1) and a block comprising the constituent units (6).

<Synthesis of Copolymer>

The copolymer constituting the solid polymer electrolyte may be synthesized for example by the following processes.

1) A previously synthesized oligomer having the constituent units (1) (hereinafter oligomer (1)) and a previously synthesized oligomer having the constituent units (6) (hereinafter oligomer (6)) are reacted together to produce the objective copolymer.

2) The previously synthesized oligomer (1) is reacted with monomers capable of forming the constituent units (6) to produce the objective copolymer.

3) The previously synthesized oligomer (6) is reacted with monomers capable of forming the constituent units (1) to produce the objective copolymer.

In the process 1), the oligomers (1) and (6) are synthesized such that a terminal group of the oligomer (6) is OK or SK (wherein K is a hydrogen atom or a monovalent cation species) in case that a terminal group of the oligomer (1) is a halogen atom, or such that the terminal group of the oligomer (6) is a halogen atom in case that the terminal group of the oligomer (1) is OK or SK (wherein K is a hydrogen atom or a monovalent cation species).

<Synthesis of Oligomer (1)>

The oligomer (1) may be synthesized from a monomer represented by Formula (14) below (hereinafter the monomer (14)) and a monomer represented by Formula (15) below (hereinafter the monomer (15)):

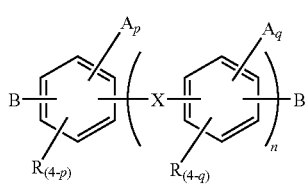

(14)

wherein X, n, p, q, R and A are as defined in Formula (2), and B is a halogen atom with preferred examples of the halogen atoms including fluorine and chlorine atoms;

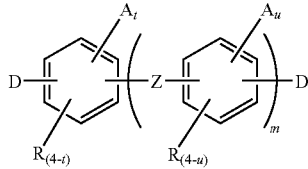

(15)

wherein Z, m, t, u, R and A are as defined in Formula (3), and D is a group represented by OK or SK (wherein K is a hydrogen atom or a monovalent cation species with preferred examples of the monovalent cations including alkali metal cations such as lithium, sodium and potassium cations).

Specific examples of the monomers (14) include the following compounds:

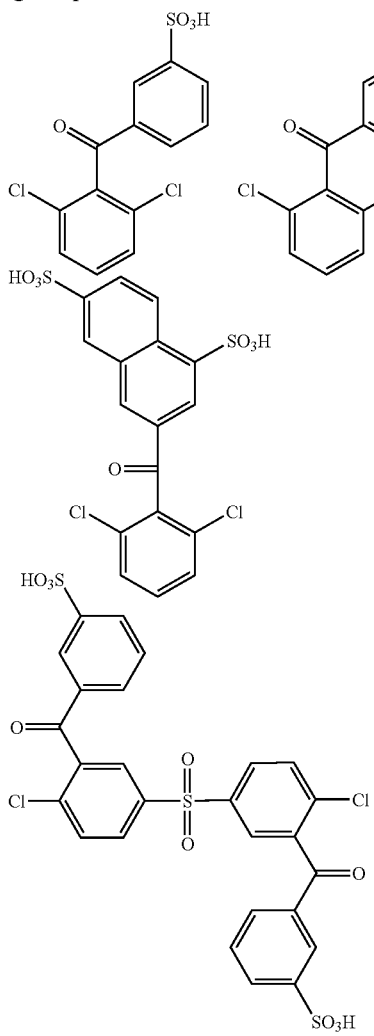

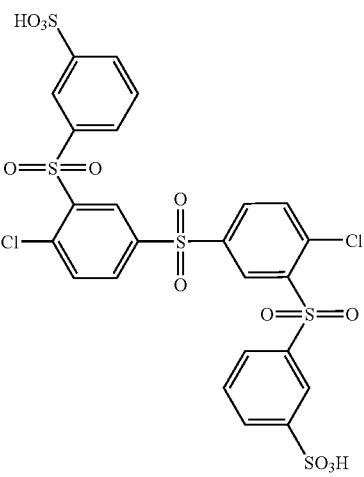

-continued

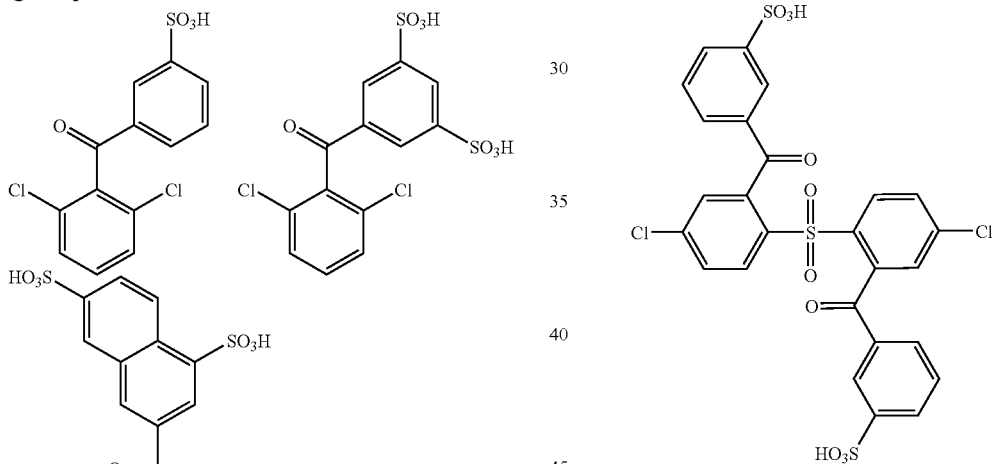

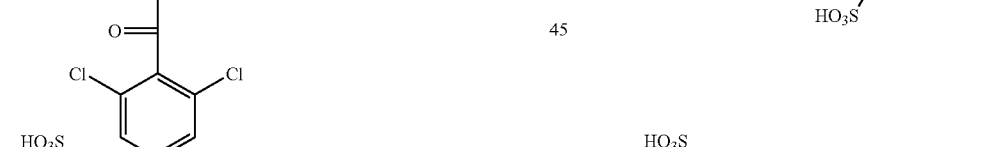

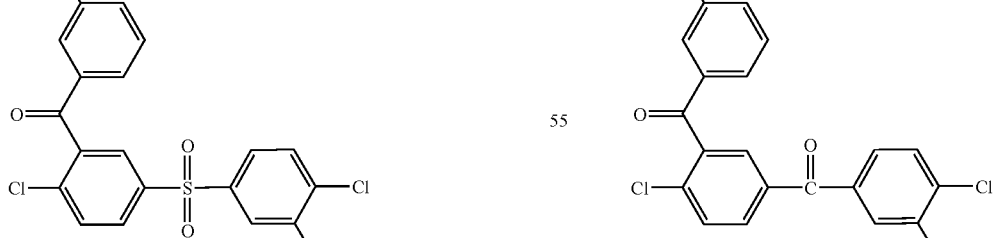

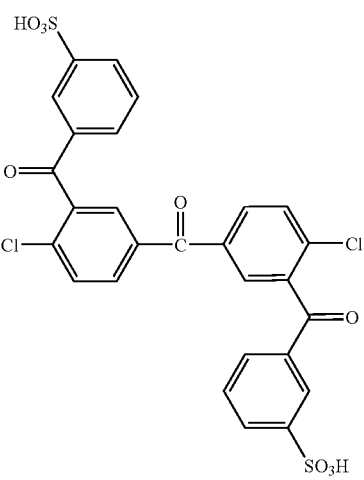

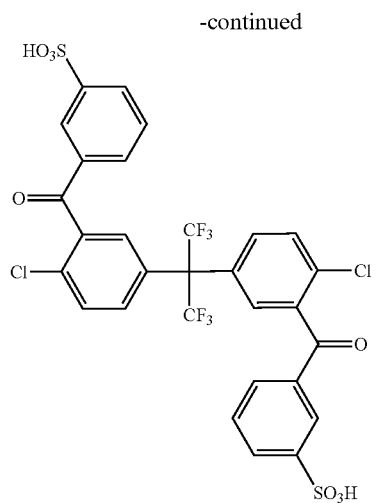
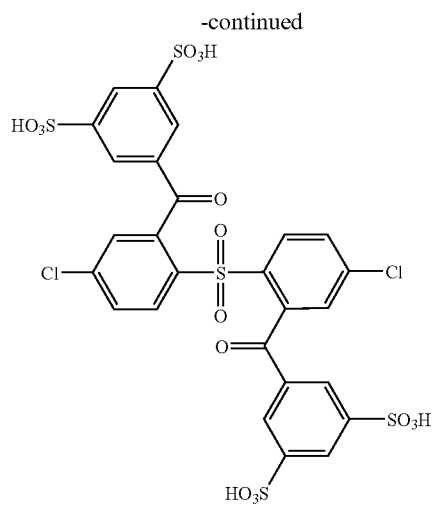
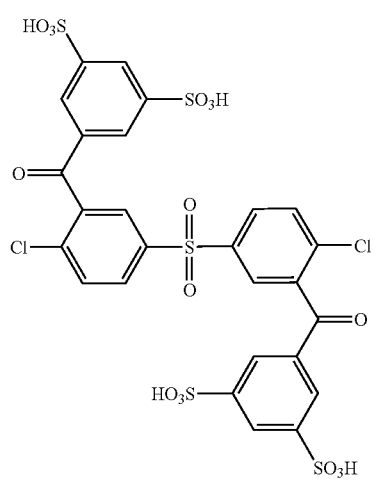
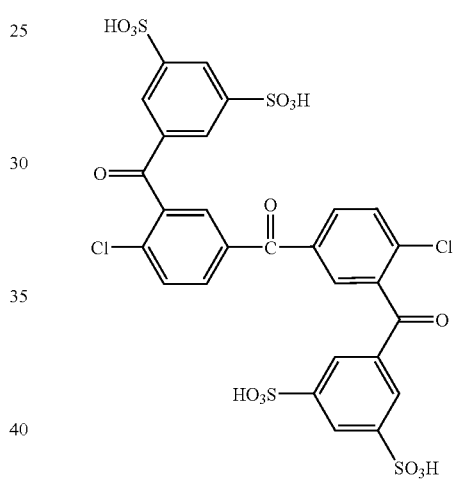
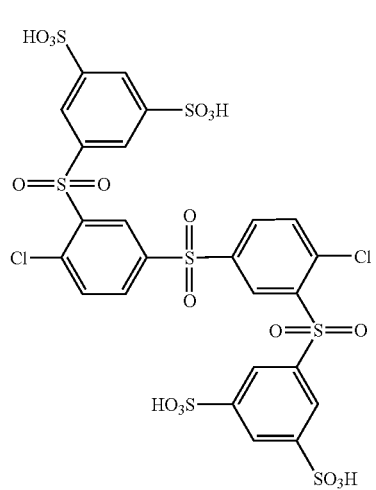
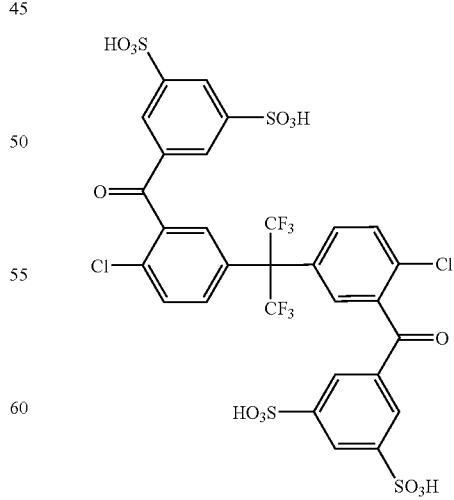

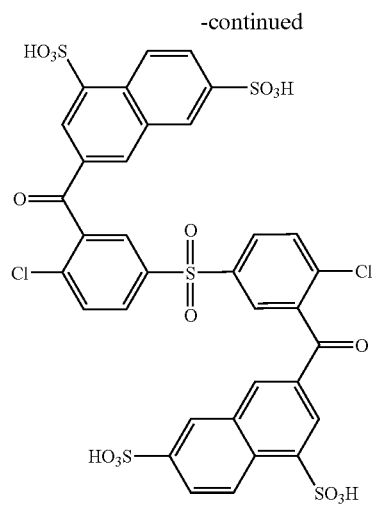

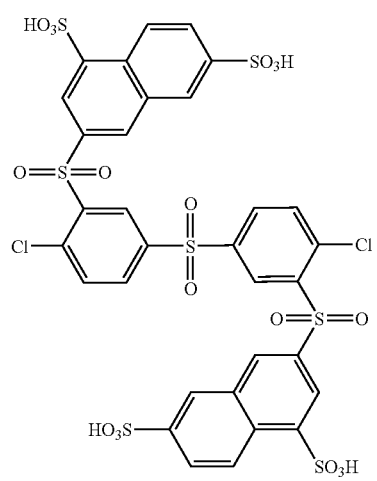

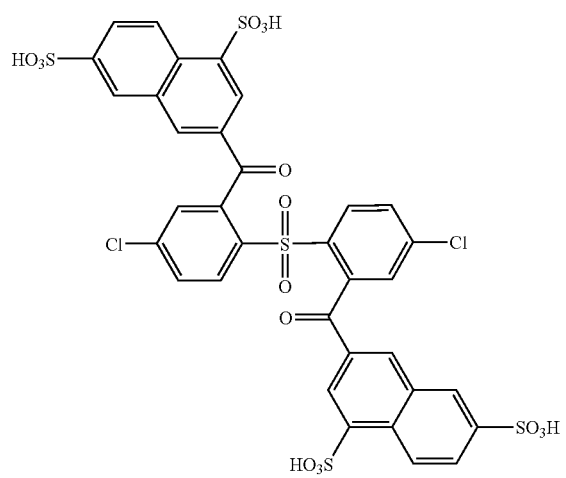

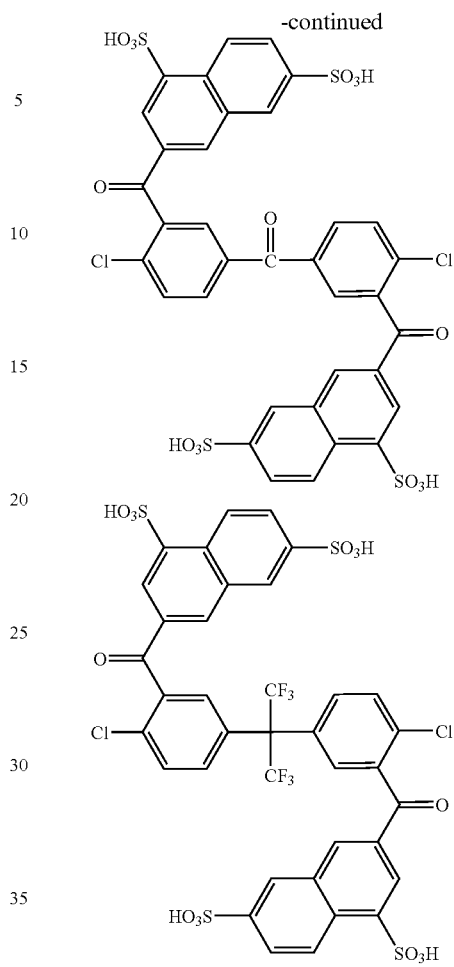

Also employable are derivatives of the above compounds in which the chlorine atom is replaced by a fluorine atom, in which —CO— is replaced by —SO$_2$—, in which —SO$_2$— is replaced by —CO—, or in which the chlorine atom is replaced by a fluorine atom and —CO— is replaced by —SO$_2$—.

Specific examples of the monomers (15) include bisphenol compounds and derivatives thereof in which the hydrogen atom in the hydroxyl group of the bisphenol compounds is replaced by a monovalent cation, such as 4,4'-biphenol, bis (4-hydroxyphenyl)sulfone, bis(4-hydroxyphenyl)ketone, 2,2-bis(4-hydroxyphenyl)propane, 2,2-bis(4-hydroxyphenyl)-1,1,1,3,3,3-hexafluoropropane, 2,2-bis(4-hydroxy-3,5-dimethylphenyl)propane, 2,2-bis(4-hydroxy-3-methylphenyl)propane, bis(4-hydroxy-2,5-dimethylphenyl)methane, bis(4-hydroxy-3,5-dimethylphenyl)methane, bis(4-hydroxyphenyl)methane, 1,1-bis(4-hydroxyphenyl)ethane, 2,2-bis(4-hydroxyphenyl)butane, 3,3-bis(4-hydroxyphenyl)pentane, 2,2-di(4-hydroxyphenyl)-4-methylpentane, 2,2-bis(4-hydroxyphenyl)phenylethane, bis(4-hydroxyphenyl)phenylmethane, bis(4-hydroxyphenyl)diphenylmethane, 9,9-bis(4-hydroxyphenyl)fluorene, 9,9-bis(3-methyl-4-hydroxyphenyl)fluorene, 9,9-bis(3-phenyl-4-hydroxyphenyl) fluorene, 1,1-bis(4-hydroxyphenyl)cyclohexane, 1,1-bis(4-hydroxyphenyl)cyclopentane and compounds represented by the following formulae:

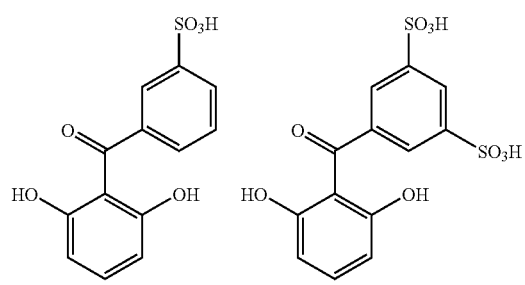
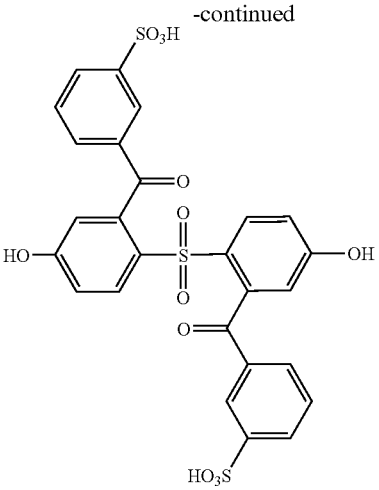
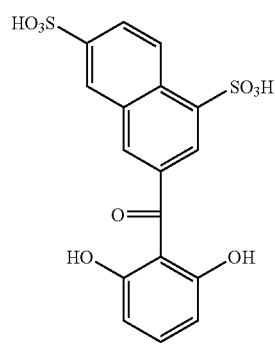
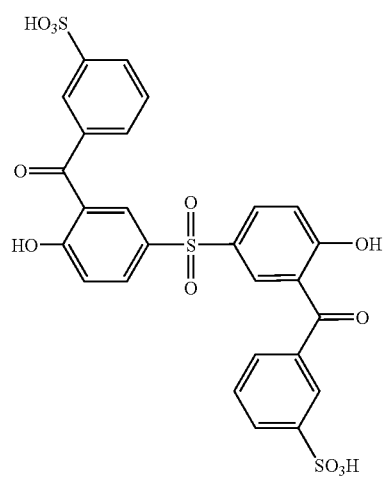
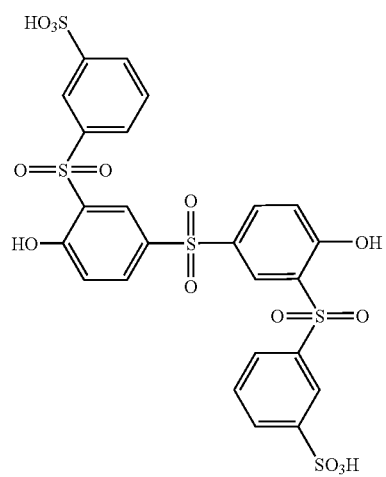
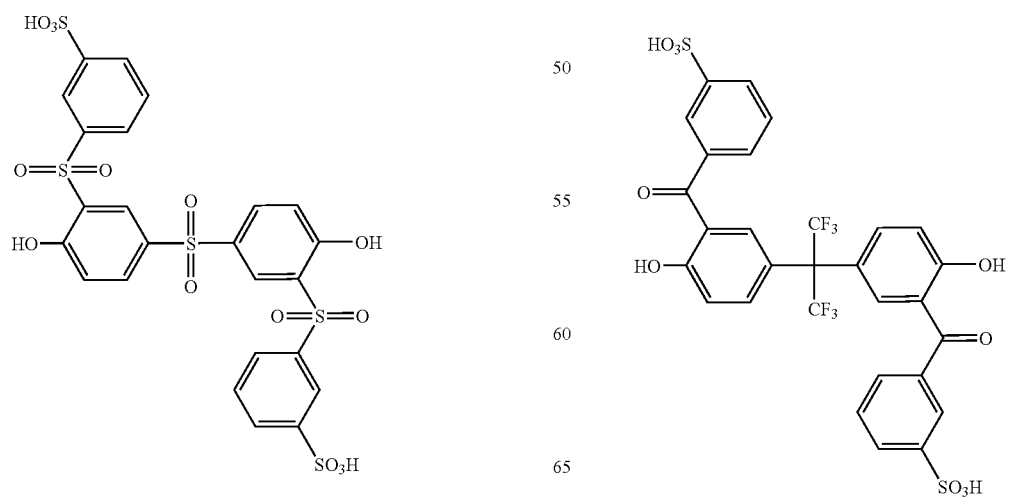

-continued
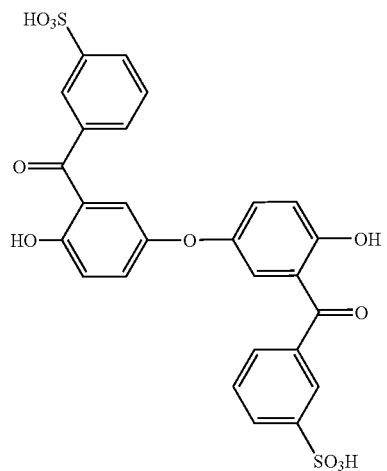
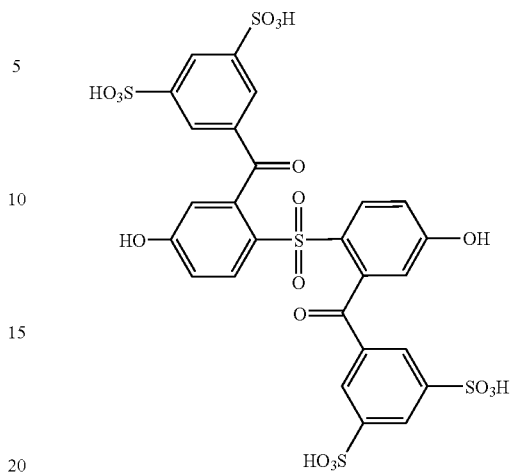
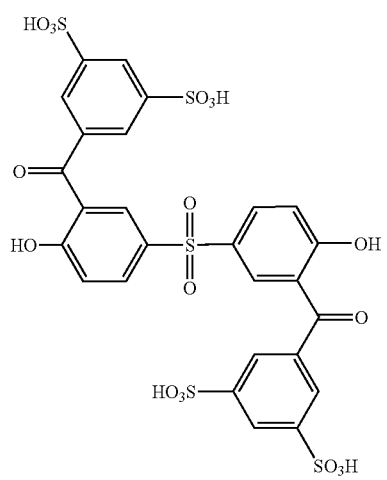
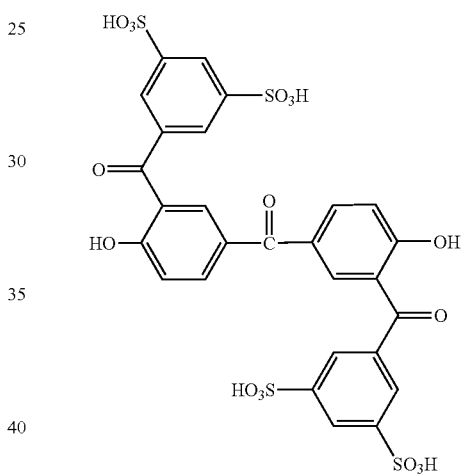
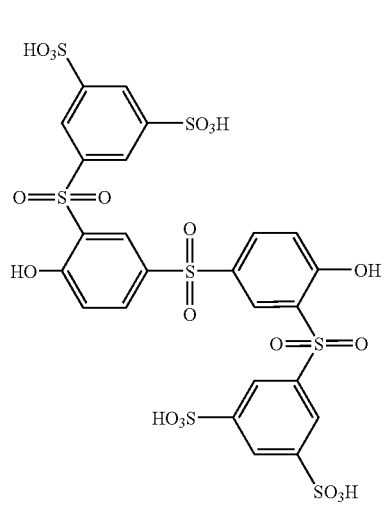
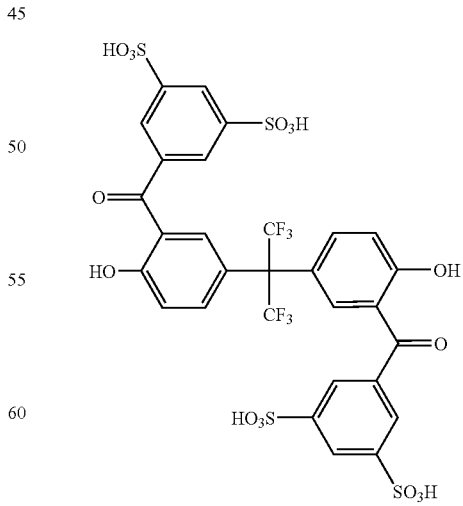

-continued
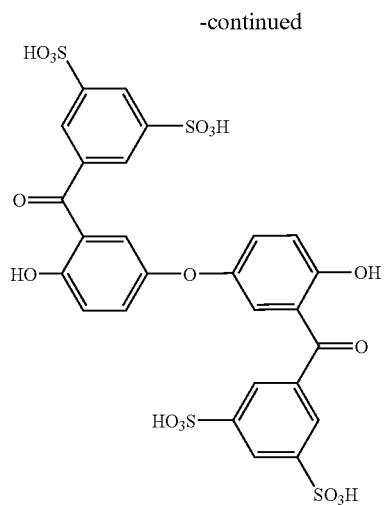
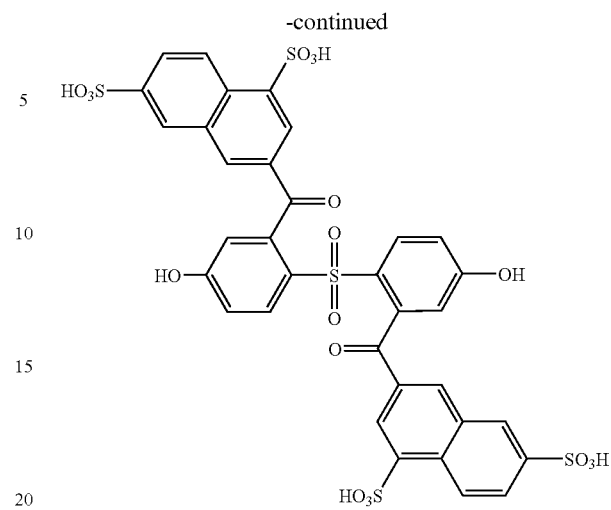
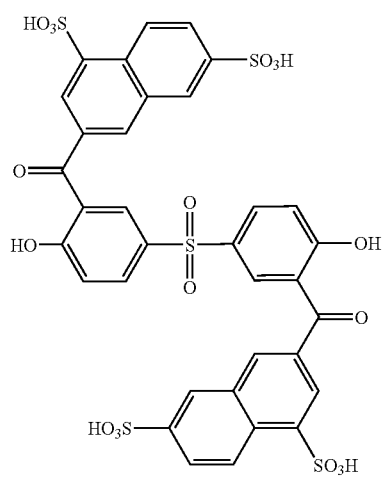
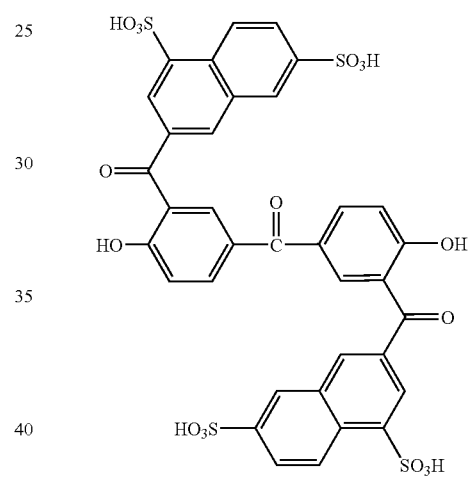
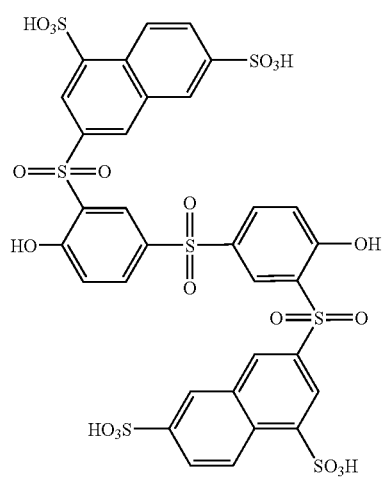
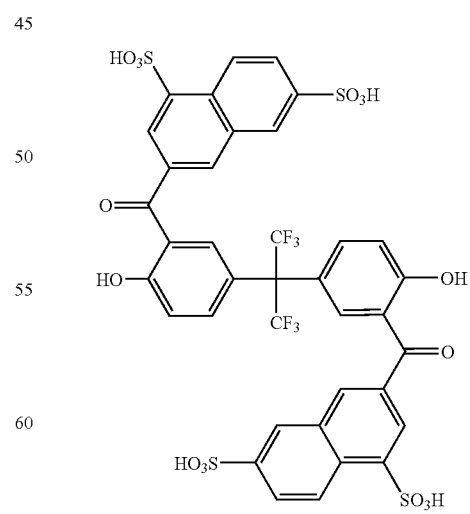

-continued
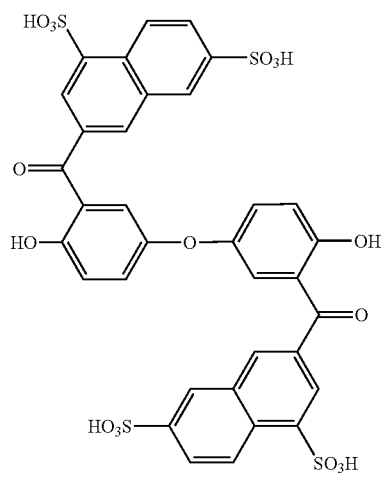
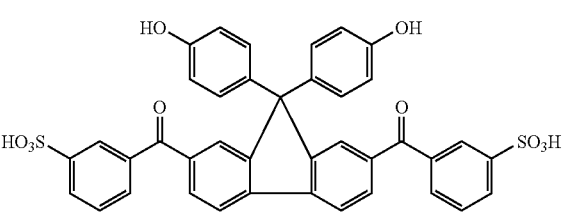
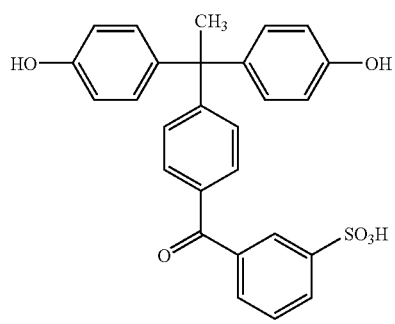
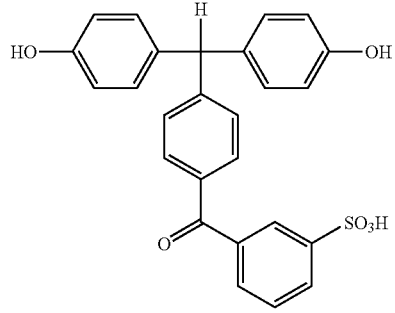
-continued
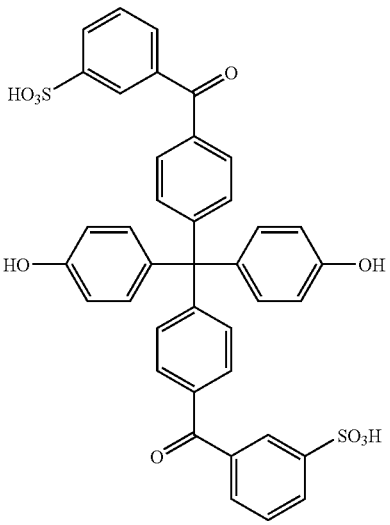
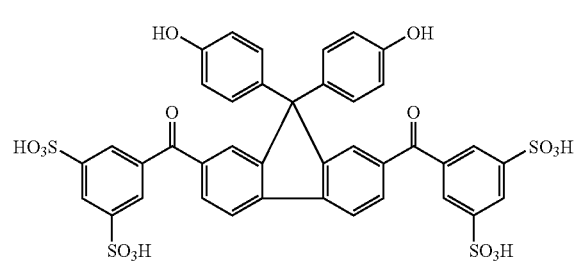
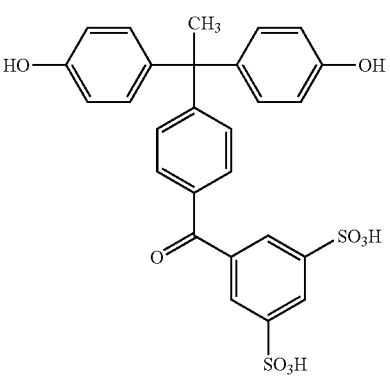
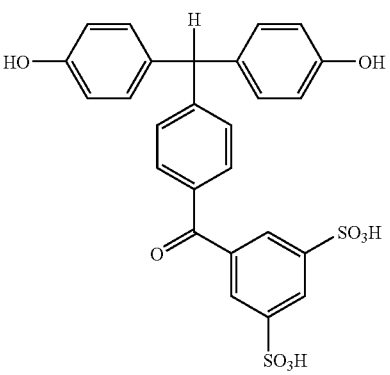

-continued

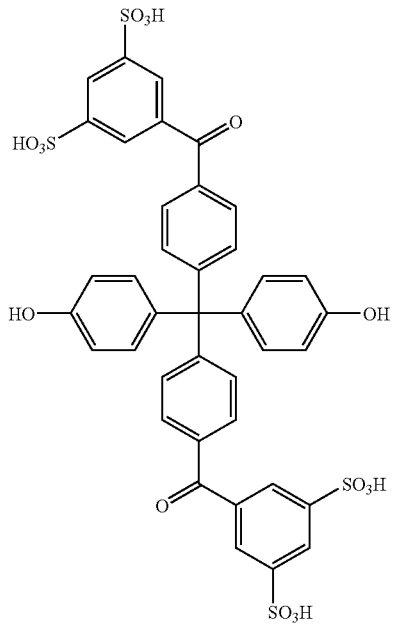

Also employable are derivatives of the above compounds in which the hydrogen atom in the hydroxyl group is replaced by a monovalent cation, in which —CO— is replaced by —SO$_2$—, or in which —SO$_2$— is replaced by —CO—.

Preferred examples of the constituent (1) include the following structures:

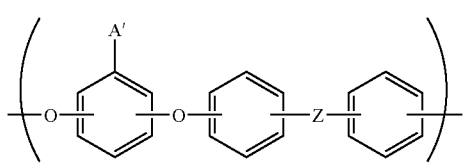 (18)

 (19)

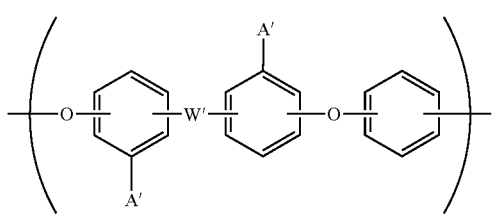 (20)

-continued

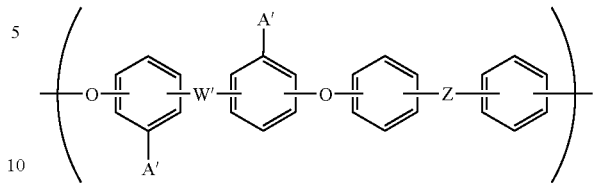 (21)

wherein W' is —CO— or —SO$_2$—; A' is a group represented by any of Formulae (22a) to (22c) below;

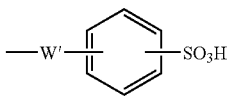 (22a)

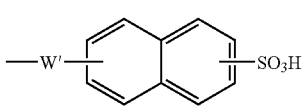 (22b)

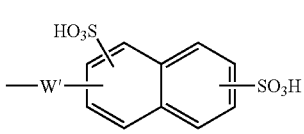 (22c)

wherein W' is —CO— or —SO$_2$—.

The oligomers (1) may be synthesized for example by nucleophilic substitution reaction as described below.

First, the monomer (15) is converted into an alkali metal salt of corresponding bisphenol by addition of an alkali metal such as lithium, sodium or potassium, or an alkali metal compound such as an alkali metal hydride, an alkali metal hydroxide or an alkali metal carbonate, in a polar solvent of high dielectric constant such as N-methyl-2-pyrrolidone, N,N-dimethylacetamide, sulfolane, diphenyl sulfone, dimethyl sulfoxide or N,N-dimethylimidazolidinone. The alkali metal is generally used in an amount 1.1 to 2 times, preferably 1.2 to 1.5 times the equivalent weight of the phenolic hydroxyl groups.

Thereafter, the alkali metal salt of the monomer (15) is reacted with the monomer (14) in the presence of a solvent that can form an azeotropic mixture with water, such as benzene, toluene, xylene, hexane, cyclohexane, octane, chlorobenzene, dioxane, tetrahydrofuran, anisole or phenetole. From the viewpoint of reactivity, the monomer (14) is preferably a fluorine or a chlorine compound.

The monomer (14) is used in an amount of 0.1 to 4.0 mol, preferably 0.3 to 2.8 mol, more preferably 0.5 to 2.0 mol per mol of the alkali metal salt of the monomer (15). The reaction temperature is in the range of 60 to 300° C., preferably 80 to 250° C. The reaction time is in the range of 15 minutes to 100 hours, preferably 1 to 24 hours.

Taking the subsequent copolymerization reaction into account, the molar ratio of the monomers (14) and (15) is desirably controlled such that the oligomer (1) will be terminated with a halogen atom or an OK or SK group (wherein K is a hydrogen atom or a monovalent cation species). Specifically, the oligomer (1) terminated with the halogen atom may be synthesized using an excess of the monomer (14) over the monomer (15). The oligomer (1) terminated with the OK or SK group may be synthesized using an excess of the monomer (15) over the monomer (14). Where necessary, the monomer used in excess may be newly added as an end-capping agent after the reaction, in an amount of 0.01 to 1 mol per mol of the monomer used in the reaction.

<Synthesis of Oligomer (6)>

The oligomer (6) may be synthesized in a manner similar to that for synthesizing the oligomer (1), from a monomer represented by Formula (16) below (hereinafter the monomer (16)) and a monomer represented by Formula (17) below (hereinafter the monomer (17)). Specifically, the oligomer (6) terminated with a halogen atom may be synthesized using an excess of the monomer (16) over the monomer (17). The oligomer (6) terminated with an OK or SK group (wherein K is a hydrogen atom or a monovalent cation species) may be synthesized using an excess of the monomer (17) over the monomer (16). Where necessary, the monomer used in excess may be newly added as an end-capping agent after the reaction, in an amount of 0.01 to 1 mol per mol of the monomer used in the reaction.

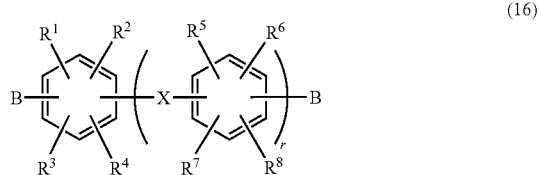

(16)

wherein X, r and $R^1$ to $R^8$ are as defined in Formula (7), and B is a halogen atom with preferred examples of the halogen atoms including fluorine and chlorine atoms;

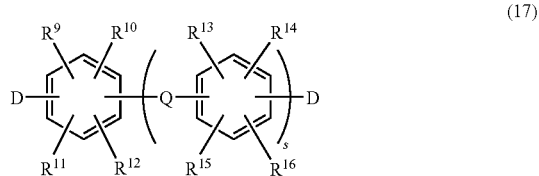

(17)

wherein Q, s and $R^9$ to $R^{16}$ are as defined in Formula (8), and D is a group represented by OK or SK (wherein K is a hydrogen atom or a monovalent cation species with preferred examples of the monovalent cations including alkali metal cations such as lithium, sodium and potassium cations).

Specific examples of the monomers (16) include 2,6-dichlorobenzonitrile, 2,6-difluorobenzonitrile, 2,3,5,6-tetrafluorobenzonitrile, 1,4-dicyano-2,3,5,6-tetrafluorobenzonitrile, 4,4'-dichlorodiphenylsulfone, 4,4'-difluorodiphenylsulfone, 4-chloro-4'-fluorodiphenylsulfone, 4,4'-dichlorobenzophenone, 4,4'-difluorobenzophenone, 4-chloro-4'-fluorobenzophenone, 2,4'-dichlorobenzophenone, bis(4-chlorophenyl)difluoromethane, 4,4'-dichlorobenzanilide and bis(4-chlorophenyl)sulfoxide.

Also employable are derivatives of the above compounds in which the chlorine atom is replaced by a fluorine, a bromine or an iodine atom, or in which at least one halogen atom substituted at the 4-position is substituted at the 3-position. The monomers (16) preferably have electron-withdrawing groups such as —CO— and —$SO_2$—.

Specific examples of the monomers (17) include bisphenol compounds and derivatives thereof in which the hydrogen atom in the hydroxyl group of the bisphenol compounds is replaced by a monovalent cation, such as 4,4'-biphenol, bis(4-hydroxyphenyl)sulfone, bis(4-hydroxyphenyl)ketone, 2,2-bis(4-hydroxyphenyl)propane, 2,2-bis(4-hydroxyphenyl)-1,1,1,3,3,3-hexafluoropropane, 2,2-bis(4-hydroxy-3,5-dimethylphenyl)propane, 2,2-bis(4-hydroxy-3-methylphenyl)propane, bis(4-hydroxy-2,5-dimethylphenyl)methane, bis(4-hydroxy-3,5-dimethylphenyl)methane, bis(4-hydroxyphenyl)methane, 1,1-bis(4-hydroxyphenyl)ethane, 2,2-bis(4-hydroxyphenyl)butane, 3,3-bis(4-hydroxyphenyl)pentane, 2,2-di(4-hydroxyphenyl)-4-methylpentane, 2,2-bis(4-hydroxyphenyl)phenylethane, bis(4-hydroxyphenyl)phenylmethane, bis(4-hydroxyphenyl)diphenylmethane, 9,9-bis(4-hydroxyphenyl)fluorene, 9,9-bis(3-methyl-4-hydroxyphenyl)fluorene, 9,9-bis(3-phenyl-4-hydroxyphenyl)fluorene, 1,1-bis(4-hydroxyphenyl)cyclohexane and 1,1-bis(4-hydroxyphenyl)cyclopentane.

<Synthesis 1 of Copolymer>

When the copolymer is synthesized by reaction of the oligomer (1) and the oligomer (6), these oligomers are previously prepared such that one of the oligomers is terminated with a halogen atom and the other oligomer terminated with an OK or SK group (wherein K is a hydrogen atom or a monovalent cation species). The reaction between the oligomers (1) and (6) is preferably made in a molar ratio [(1):(6)] of from 0.9:1.1 to 1.1:0.9, preferably from 0.95:1.05 to 1.05:0.95, more preferably from 0.99:1.01 to 1.01 to 0.99.

<Synthesis 2 and 3 of Copolymer>

Synthesis of the copolymer by reacting the oligomer (6) with the monomers (14) and (15) capable of forming the oligomer (1) may be performed using a process and conditions similar to those for synthesizing the oligomer (1) as aforementioned. In this case, to produce the oligomer (1) terminated with a halogen atom, the reaction is preferably performed in a molar ratio of the oligomer (1) plus the monomer (14) to the monomer (15) [(1)+(14):(15)] in the range of 0.9:1.1 to 1.1:0.9, preferably 0.95:1.05 to 1.05:0.95, more preferably 0.99:1.01 to 1.01:0.99. To produce the oligomer (1) terminated with an OK or SK group (wherein K is a hydrogen atom or a monovalent cation species), the reaction is preferably performed in a molar ratio of the oligomer (1) plus the monomer (15) to the monomer (14) [(1)+(15):(14)] in the range of 0.9:1.1 to 1.1:0.9, preferably 0.95:1.05 to 1.05:0.95, more preferably 0.99:1.01 to 1.01:0.99.

The same applies to synthesis of the copolymer by reacting the oligomer (1) with the monomers (16) and (17) capable of forming the oligomer (6). In this case, to produce the oligomer (6) terminated with a halogen atom, the reaction is preferably performed in a molar ratio of the oligomer (6) plus the monomer (16) to the monomer (17) [(6)+(16):(17)] in the range of 0.9:1.1 to 1.1:0.9, preferably 0.95:1.05 to 1.05:0.95, more preferably 0.99:1.01 to 1.01:0.99. To produce the oligomer (6) terminated with an OK or SK group (wherein K is a hydrogen atom or a monovalent cation species), the reaction is preferably performed in a molar ratio of the oligomer (6) plus the monomer (17) to the monomer (16) [(6)+(17):(16)] in the range of 0.9:1.1 to 1.01:0.9, preferably 0.95:1.05 to 1.05:0.95, more preferably 0.99:1.01 to 1.01:0.99.

<Acid Treatment>

When the copolymer for constituting the polymer electrolyte of the present invention is obtained with its protonic acid group being a protonic acid salt (such as —$SO_3Na$), the salt group may be converted into a protonic acid group by acid treatment. The acid treatment may utilize hydrochloric acid, sulfuric acid, nitric acid and acetic acid, with hydrochloric acid and sulfuric acid being preferred. The concentration is preferably 0.1 to 8 normality, more preferably 1 to 5 normality. The acid treatment may be performed by soaking the copolymer in the powder form as produced in an acidic aqueous solution of the above concentration followed by washing to a pH of not more than 5, or may be performed by treating a film of the copolymer in an acidic aqueous solution followed by washing to a pH of not more than 5.

The copolymer constituting the polymer electrolyte of the invention generally contains the protonic acid groups in an amount of 0.3 to 4 meq/g, preferably 0.5 to 3 meq/g, more preferably 0.8 to 2.8 meq/g. If the content of protonic acid groups is less than this, the proton conductivity will not reach a practical level. When the content exceeds this range, water resistance can be drastically deteriorated. The protonic acid group content may be controlled by changing the types, amounts and combinations of the monomers (14) to (17) and by altering the proportion between the constituent units (1) and (6).

<Molecular Weight>

From the viewpoint of the balance of strength and processability, the copolymer constituting the polymer electrolyte ranges in weight-average molecular weight in terms of polystyrene (hereinafter Mw) from 10,000 to 1,000,000, preferably from 20,000 to 500,000, more preferably from 50,000 to 300,000 as measured by gel permeation chromatography (GPC). When Mw is less than this, the polymer electrolyte will fail to display sufficient strength. Mw exceeding this range can make processing difficult.

<Additives>

The polymer electrolyte of the invention may contain, in addition to the copolymer, additives such as: antioxidants; inorganic acids such as sulfuric and phosphoric acid; inorganic proton conductive particles such as phosphate glass, tungsten acid, phosphate hydrate, proton-introduced β-alumina and proton-introduced metal oxides; organic acids including carboxylic acids; organic acids including sulfonic acid; organic acids including phosphonic acid; and appropriate amounts of water.

As the antioxidants, hindered phenol compounds with molecular weights of not less than 500 are preferable. Such antioxidants provide higher durability of the electrolyte.

The hindered phenol compounds include triethyleneglycol-bis[3-(3-t-butyl-5-methyl-4-hydroxyphenyl)propionate] (trade name: IRGANOX 245), 1,6-hexanediol-bis[3-(3,5-di-t-butyl-4-hydroxyphenyl)propionate] (trade name: IRGANOX 259), 2,4-bis-(n-octylthio)-6-(4-hydroxy-3,5-di-t-butylanilino)-3,5-triadine (trade name: IRGANOX 565), pentaerythrithyl-tetrakis[3-(3,5-di-t-butyl-4-hydroxyphenyl)propionate] (trade name: IRGANOX 1010), 2,2-thio-diethylenebis[3-(3,5-di-t-butyl-4-hydroxyphenyl)propionate] (trade name: IRGANOX 1035), octadecyl-3-(3,5-di-t-butyl-4-hydroxyphenyl)propionate (trade name: IRGANOX 1076), N,N-hexamethylenebis(3,5-di-t-butyl-4-hydroxy-hydrocinnamide) (trade name: IRGANOX 1098), 1,3,5-trimethyl-2,4,6-tris(3,5-di-t-butyl-4-hydroxybenzyl)benzene (trade name: IRGANOX 1330), tris-(3,5-di-t-butyl-4-hydroxybenzyl)-isocyanurate (trade name: IRGANOX 3114) and 3,9-bis[2-[3-(3-t-butyl-4-hydroxy-5-methylphenyl)propionyl oxy]-1,1-dimethylethyl]-2,4,8,10-tetraoxaspiro[5.5]undecane (trade name: Sumilizer GA-80).

The amounts of the additives to the polymer electrolyte are not particularly limited, and the additives may be used in optimum amounts depending on the oxidation resistance, proton conductivity, strength and elastic modulus required of the polymer electrolyte. For example, the additives may desirably be used in a total amount of 0.001 to 30 parts by weight, preferably 0.01 to 10 parts by weight with respect to 100 parts by weight of the copolymer. The additives may be used singly or in combination of two or more kinds.

<Applications>

The polymer electrolyte formed in a membrane shape may be used as proton conductive membranes as will be described later. The polymer electrolyte may also be used as electrolytes in electrode catalyst layers in solid polymer fuel cells, namely, electrode electrolytes.

The applications of the polymer electrolyte of the present invention are not limited to the fuel cells, and include hydrohalic acid electrolysis, brine electrolysis, oxygen concentrators, humidity sensors and gas sensors.

[Proton Conductive Membranes]

The proton conductive membrane according to the present invention may be produced by a casting method in which the copolymer having the constituent units (1) and (6) is dissolved or swollen in a solvent, and is cast over a substrate to form a film.

The substrate used herein is not particularly limited as long as it is commonly used in the solution casting methods. Examples include plastic substrates and metal substrates, and preferred examples include thermoplastic resin substrates such as polyethyleneterephthalate (PET) films.

Examples of the solvents for dissolving or swelling the copolymer include aprotic polar solvents such as N-methyl-2-pyrrolidone, N,N-dimethylformamide, γ-butyrolactone, N,N-dimethylacetamide, dimethylsulfoxide, dimethylurea, dimethylimidazolidinone and acetonitrile; chlorine solvents such as dichloromethane, chloroform, 1,2-dichloroethane, chlorobenzene and dichlorobenzene; alcohols such as methanol, ethanol, propanol, iso-propyl alcohol, sec-butyl alcohol and tert-butyl alcohol; alkylene glycol monoalkyl ethers such as ethylene glycol monomethyl ether, ethylene glycol monoethyl ether and propylene glycol monoethyl ether; ketones such as acetone, methyl ethyl ketone, cyclohexanone and γ-butyrolactone; and ethers such as tetrahydrofuran and 1,3-dioxane. The solvents may be used singly or in combination of two or more kinds. In particular, N-methyl-2-pyrrolidone (hereinafter NMP) is preferable in view of solvent properties and solution viscosity.

The solvent may be a mixture of the aprotic polar solvent and other solvent, in which case the composition of the mixture is 95-25% by weight, preferably 90-25% by weight the aprotic polar solvent and 5-75% by weight, preferably 10-75% by weight the other solvent (provided that the total of the two is 100% by weight). This proportion of the other solvent leads to an appropriately low solution viscosity. Preferred examples of the combinations of the aprotic polar solvent and other solvent include NMP (aprotic polar solvent) and methanol (solvent which ensures an appropriately low solution viscosity over a wide range of proportions of the copolymer).

Although the polymer concentration in the solution of the copolymer depends on the copolymer's molecular weight, it is generally from 5 to 40% by weight, preferably from 7 to 25% by weight. The polymer concentration less than this will cause difficulties in producing the membrane in large thickness and tends to result in easy occurrence of pinholes. When the polymer concentration exceeds the above range, the solution viscosity becomes so high that the film production will be difficult and further the film obtained may have low surface smoothness.

The solution viscosity may vary depending on the copolymer's molecular weight, polymer concentration and additives concentration. Generally, it ranges from 2,000 to 100,000 mPa·s, preferably from 3,000 to 50,000 mPa·s. When the solution viscosity is less than this, the solution will have too high a fluidity and may spill out of the substrate during the membrane production. The viscosity exceeding this range is so high that the solution cannot be extruded through a die and the flow-casting for the film production may be difficult.

The wet film obtained as described above may be soaked in water to substitute the remaining organic solvent in the film with water. By this treatment the residual solvent in the membrane can be reduced. Prior to the soak into water, the wet film may be predried. The predrying may be performed by maintaining the wet film at 50 to 150° C. for 0.1 to 10 hours.

Soaking the wet films (or the predried films, the same applies hereinafter) in water may be carried out batchwise with respect to each sheet, or may be a continuous process wherein the films, which may be in the original form of laminate with the substrate film (e.g. PET film) as produced or which may be released from the substrate, are soaked in water and wound sequentially. In the batchwise soaking, the wet films are preferably soaked in water in a state such that they are framed or fixed by similar means to prevent wrinkles from forming on the surface of treated films.

When the wet films are soaked in water, the amount of water is at least 10 parts by weight, preferably at least 30 parts by weight, more preferably at least 50 parts by weight based on 1 part by weight of the wet films. This amount of water leads to reduction of the solvent remaining in the proton conductive membrane. In order to reduce the residual solvent in the proton conductive membrane, it is also effective to keep the concentration of the organic solvent in water at or below a certain level by renewing water used in the soaking or by letting the water overflow. The in-plane distribution of the organic solvent within the proton conductive membrane may be effectively uniformed by homogenizing the organic solvent concentration in water by stirring or the like.

When the wet film is soaked in water, the water has a temperature of 5 to 80° C., preferably 10 to 60° C. in view of substitution rate and easy handling. Although the substitution between the organic solvent and water can take place at a higher rate as the water temperature rises, the water absorption of the film will also increase at higher temperatures. Accordingly, the proton conductive membrane can display a deteriorated surface condition after dried. The soaking time varies depending on the initial amount of residual solvent, water amount and treatment temperature. Generally, the soaking time ranges from 10 minutes to 240 hours, preferably from 30 minutes to 100 hours.

When the wet film which has been soaked in water is dried, the membrane obtained has a reduced amount of residual solvent, generally not more than 5% by weight. Controlling the soaking conditions enables reduction of the residual solvent down to not more than 1% by weight of the membrane. For example, this further reduction is possible when the wet film is soaked in water that is at least 50 parts by weight based on 1 part by weight of the wet film, at a water temperature of 10 to 60° C. for 10 minutes to 10 hours.

After the wet film has been soaked in water as described above, the film is dried at 30 to 100° C., preferably 50 to 80° C., for 10 to 180 minutes, preferably 15 to 60 minutes. Subsequently, it is vacuum dried at 50 to 150° C. and preferably at 500 to 0.1 mmHg for 0.5 to 24 hours to give an objective membrane.

The proton conductive membrane generally has a dry thickness of from 10 to 100 μm, preferably from 20 to 80 μm.

[Electrode Paste]

The electrode paste according to the present invention includes the electrode electrolyte (polymer electrolyte) described above, catalyst-supporting carbon and a solvent. Where necessary, the paste may contain other components such as dispersants and carbon fibers.

<Catalyst>

The catalyst supported on carbon may be platinum or platinum alloy. The use of platinum alloy can increase stability and activity of the electrode catalyst. Preferred examples of the platinum alloys include alloys formed between platinum and at least one metal selected from the group consisting of platinum group metals except platinum (ruthenium, rhodium, palladium, osmium and iridium), iron, titanium, gold, silver, chromium, manganese, molybdenum, tungsten, aluminum, silicon, rhenium, zinc and tin. The platinum alloys may contain intermetallic compounds of platinum and alloying metals.

<Carbon>

The carbon for supporting the aforesaid catalyst may be carbon blacks such as oil furnace blacks, channel blacks, lamp blacks, thermal blacks and acetylene blacks. Furthermore, natural graphites, pitches, cokes, and synthetic graphites and carbons obtained from organic compounds such as polyacrylonitriles, phenolic resins and furan resins, are also employable.

The oil furnace blacks include VULCAN XC-72, VULCAN P, BLACK PEARLS 880, BLACK PEARLS 1100, BLACK PEARLS 1300, BLACK PEARLS 2000, REGAL 400 (all available from Cabot Corporation), KETJENBLACK EC (available from Lion Corporation), and products Nos. 3150 and 3250 of Mitsubishi Chemical Corporation. The acetylene blacks include DENKA BLACK (available from Denki Kagaku Kogyo K.K.).

The carbon may be in the form of particles or fibers. The amount of the catalyst supported on the carbon is not particularly limited as long as effective catalytic activity is exhibited. For example, the amount of the catalyst relative to the carbon weight is in the range of 0.1 to 9.0 g-metal/g-carbon, preferably 0.25 to 2.4 g-metal/g-carbon.

<Solvent>

The solvent used in the electrode paste is not particularly limited as long as the electrode electrolyte can be dissolved or dispersed therein. The solvent may be a single solvent or a mixture of two or more kinds of solvents.

Specific examples of the solvents include water; alcohols such as methanol, ethanol, n-propyl alcohol, 2-propanol, 2-methyl-2-propanol, 2-butanol, n-butyl alcohol, 2-methyl-1-propanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, cyclohexanol, 1-hexanol, 2-methyl-1-pentanol, 2-methyl-2-pentanol, 4-methyl-2-pentanol, 2-ethyl-1-butanol, 1-methylcyclohexanol, 2-methylcyclohexanol, 3-methylcyclohexanol, 4-methylcyclohexanol, 1-octanol, 2-octanol, 2-ethyl-1-hexanol, 2-methoxyethanol, 2-ethoxyethanol, 2-(methoxymethoxy)ethanol, 2-isopropoxyethanol, 1-methoxy-2-propanol and 1-ethoxy-2-propanol; polyhydric alcohols such as ethylene glycol, propylene glycol and glycerol; ethers such as dioxane, tetrahydrofuran, tetrahydropyran, diethyl ether, diisopropyl ether, di-n-propyl ether, butyl ether, phenyl ether, isopentyl ether, 1,2-dimethoxyethane, diethoxyethane, bis(2-methoxyethyl) ether, bis(2-ethoxyethyl)ether, cineol, benzyl ethyl ether, anisole, phenetole and acetal; ketones such as acetone, methyl ethyl ketone, 2-pentanone, 3-pentanone, cyclopentanone, cyclohexanone, 2-hexanone, 4-methyl-2-pentanone, 2-heptanone, 2,4-dimethyl-3-pentanone and 2-octanone; esters such as γ-butyrolactone, ethyl acetate, propyl acetate, n-butyl acetate, iso-butyl acetate, sec-butyl acetate, pentyl acetate, isopentyl acetate, 3-methoxybutyl acetate, methyl butyrate, ethyl butyrate, methyl lactate, ethyl lactate and butyl lactate; aprotic polar solvents such as dimethylsulfoxide, N-methylformamide, N,N-dimethylformamide, N,N-diethylformamide, N,N-dimethylacetamide, N-methyl-2-pyrrolidone and tetramethylurea; and hydrocarbon solvents such as toluene, xylene, pentane, hexane, heptane and octane.

<Dispersant>

The electrode paste may contain a dispersant as required. Examples of the dispersants include surfactants such as anionic surfactants, cationic surfactants, amphoteric surfactants and nonionic surfactants.

The anionic surfactants include N-methyltauro oleic acid, potassium oleate/diethanolamine salts, triethanolamine alkylether sulfate, triethanolamine polyoxyethylene alkylether sulfate, amine salts of specially modified polyetherester acids, amine salts of higher fatty acid derivatives, amine salts of specially modified polyester acids, amine salts of high molecular weight polyetherester acids, amine salts of specially modified phosphates, amidoamine salts of high molecular weight polyester acids, amidoamine salts of special fatty acid derivatives, alkylamine salts of higher fatty acids, amidoamine salts of high molecular weight polycarboxylic acids, sodium laurate, sodium stearate, sodium oleate, sodium lauryl sulfate, sodium cetyl sulfate, sodium stearyl sulfate, sodium oleyl sulfate, lauryl ether sulfate, sodium alkylbenzene sulfonate, oil-soluble alkylbenzene sulfonate, α-olefin sulfonate, disodium higher alcohol monophosphate, disodium higher alcohol diphosphate and zinc dialkyldithiophosphate.

The cationic surfactants include benzyldimethyl{2-[2-(P-1,1,3,3-tetramethylbutylphenoxy)eth oxy]ethyl}ammonium chloride, octadecylamine acetate, tetradecylamine acetate, octadecyltrimethylammonium chloride, tallowtrimethylammonium chloride, dodecyltrimethylammonium chloride, cocotrimethylammonium chloride, hexadecyltrimethylammonium chloride, behenyltrimethylammonium chloride, cocodimethylbenzylammonium chloride, tetradecyldimethylbenzylammonium chloride, octadecyldimethylbenzylammonium chloride, dioleyldimethylammonium chloride, quaternary salt of 1-hydroxyethyl-2-tallowimidazoline, 2-heptadecenyl-hydroxyethylimidazoline, stearamidoethyldiethylamine acetate, stearamidoethyldiethylamine hydrochloride, triethanolamine monostearate formate, alkylpyridium salts, ethylene oxide adducts with higher alkylamines, polyacrylamide amine salts, modified polyacrylamide amine salts and quaternary ammonium iodide of perfluoroalkyl.

The amphoteric surfactants include dimethylcocobetaine, dimethyllaurylbetaine, laurylaminoethylglycinesodium, sodium laurylaminopropionate, stearyldimethylbetaine, lauryldihydroxyethylbetaine, amidobetaine, imidazoliniumbetaine, lecithin, sodium 3-[ω-fluoroalkanoyl-N-ethylamino]-1-propanesulfonate and N-[3-(perfluorooctanesulfonamido)propyl]-N,N-dimethyl-N-carboxymethyleneammoniumbetaine.

The nonionic surfactants include cocofatty acid diethanolamide (1:2 type), cocofatty acid diethanolamide (1:1 type), tallow diethanolamide (1:2 type), tallow diethanolamide (1:1 type), oleic acid diethanolamide (1:1 type), hydroxyethyl laurylamine, polyethylene glycol laurylamine, polyethylene glycol cocoamine, polyethylene glycol stearylamine, polyethylene glycol tallowamine, polyethylene glycol tallowpropylenediamine, polyethylene glycol dioleylamine, dimethyllaurylamine oxide, dimethylstearylamine oxide, dihydroxyethyllaurylamine oxide, perfluoroalkylamine oxide, polyvinylpyrrolidone, ethylene oxide adducts of higher alcohol, ethylene oxide adducts of alkylphenol, ethylene oxide adducts of fatty acid, ethylene oxide adducts of polypropylene glycol, fatty acid esters of glycerol, fatty acid esters of pentaerythritol, fatty acid esters of sorbitol, fatty acid esters of sorbitan and fatty acid esters of sugar.

The surfactants may be used singly or in combination of two or more kinds. Of the above surfactants, the surfactants having basic groups are preferred, and the anionic and cationic surfactants are more preferred, and the surfactants ranging in molecular weight from 5,000 to 30,000 are even more preferred.

The surfactants give the electrode paste good storage stability and fluidity, and also enable excellent application properties.

<Carbon Fiber>

The electrode paste of the invention may contain carbon fiber as required. Examples of the carbon fibers include rayon carbon fibers, PAN carbon fibers, Ligunin-Poval carbon fibers, pitch carbon fibers and vapor grown carbon fibers. Of these, the vapor grown carbon fibers are preferable.

Addition of the carbon fiber enables the electrode paste to give electrodes having larger pore volumes. Consequently, the diffusibility of the fuel and oxygen gases can be enhanced and the flooding of water produced or other similar problems can be prevented, leading to improved generating performance.

<Additives>

The electrode paste may contain other components as required, for example water repellents such as fluorine or silicon polymers. The water repellents provide effects of effectively discharging water produced and thereby contribute to improving generating performance.

<Composition>

The electrode paste of the invention contains: 1 to 20%, preferably 3 to 15% by weight the catalyst-supporting carbon; 0.5 to 30%, preferably 1 to 15% by weight the electrode electrolyte; 5 to 95%, preferably 15 to 90% by weight the organic solvent; and optionally 0 to 10% by weight, preferably 0 to 2% by weight the dispersant and 0 to 20%, preferably 1 to 10% by weight the carbon fiber. The total content of these components does not exceed 100% by weight.

When the amount of the catalyst-supporting carbon falls below the aforesaid range, the electrode reactivity will be lowered. When it exceeds the aforesaid range, the electrode paste will be so viscous that the application often results in irregular surfaces.

When the amount of the electrode electrolyte is less than the aforesaid range, the proton conductivity will be lowered and the electrolyte cannot work as a binder, often resulting in failure of electrode formation. When the electrolyte is used in amounts above the aforesaid range, the pore volume in the electrode will decrease.

When the organic solvent is used in amounts within the aforesaid range, the resultant electrode can have a sufficient pore volume for power generation, and the paste can be handled easily.

The use of the dispersant in the above amounts will lead to the electrode paste having excellent storage stability. When the carbon fiber is used in amounts less than the aforesaid range, the increase of pore volume of electrode will be insufficient. When the amount of carbon fiber exceeds the aforesaid range, the electrode reactivity will be lowered.

<Preparation of Paste>

The electrode paste according to the invention may be produced by mixing the components in the above-described amounts and kneading the mixture by a common procedure.

The addition sequence of the components is not particularly limited. For example, and preferably, all the components may be mixed together and stirred for a given time. Also preferably, the components other than the dispersant may be mixed together and stirred for a given time, and the dispersant may be added as required followed by stirring for a given time. The amount of the solvent may be controlled as required to control the paste viscosity.

[Membrane-Electrode Assembly]

The membrane-electrode assembly (hereinafter MEA) according to the present invention includes a proton conductive membrane and electrode layers, and the proton conductive membrane and/or electrode layers include the polymer electrolyte described above. That is, the MEA according to the invention includes the proton conductive membrane of the invention and/or electrode layers formed from the electrode paste of the invention. When the MEA has the proton conductive membrane of the invention, the electrode layers may be those made from the electrode paste of the invention or may be those formed from other known electrode paste. When the MEA has the electrode layers formed from the electrode paste of the invention, the proton conductive membrane may be that of the present invention or other known proton conductive membrane.

The MEA of the invention may be fabricated by a series of steps in which the electrode paste of the invention or a known electrode paste is applied to a transfer substrate, the solvent is removed, the resultant electrode layers are transferred to both surfaces of the proton conductive membrane of the invention or a known proton conductive membrane.

The transfer substrate may be a fluorine polymer sheet such as polytetrafluoroethylene (PTFE) sheet, or a glass or metal plate whose surface has been treated with a releasing agent. Polyethyleneterephthalate (PET) sheets are also employable.

The application methods include brushing, brush coating, bar coating, knife coating, doctor blade coating, screen printing and spray coating.

Hot pressing is an example process for transferring the electrode layers to the proton conductive membrane, in which the electrode paste is applied to carbon paper or release sheet, and the surfaces coated with the electrode paste are thermocompression bonded to the proton conductive membrane. The hot pressing is generally performed at 50 to 250° C. for 1 to 180 minutes at 10 to 500 kg/cm².

An alternative process for manufacturing the MEA of the invention is stepwise formation of the catalyst layers and proton conductive membrane by repeating stepwise the application and drying of the electrode paste and polymer electrolyte solution for the proton conductive membrane production. The application and drying sequences are not particularly limited.

For example, the polymer electrolyte solution is applied to the substrate such as a PET film, and the coating is dried to give a proton conductive membrane. Subsequently, the electrode paste is applied onto the proton conductive membrane, and the solvent is removed by drying to form an electrode layer. Thereafter, the substrate is removed, and the electrode paste is applied onto the exposed surface of the proton conductive membrane, followed by removing the solvent. Consequently, the MEA is produced in which the proton conductive membrane is sandwiched between the catalyst layers.

The above process may be carried out in an altered order. That is, the electrode paste is applied to form an electrode layer, on which the polymer electrolyte solution is applied to form a proton conductive membrane. Subsequently, the electrode paste is applied to the exposed surface of the proton conductive membrane to form an electrode layer. The MEA of the invention can be thus manufactured.

The application of the electrode paste and polymer electrolyte solution may be performed by methods similar to as described above. The drying for removing the solvent may be carried out at 20 to 180° C., preferably 50 to 160° C., for 5 to 600 minutes, preferably 30 to 400 minutes. The solvent may be removed by soaking in water as required, in which case the water temperature is 5 to 120° C., preferably 15 to 95° C., and the soaking time is from 1 minute to 72 hours, preferably from 5 minutes to 48 hours.

The thickness of the electrode layers is not particularly limited but is desirably such that the metal supported as the catalyst is present at 0.05 to 4.0 mg/cm², preferably 0.1 to 2.0 mg/cm². When the thickness is as such, the electrode layers can display sufficiently high catalytic activity and effectively conduct protons.

The pore volume of the electrode layers is desirably in the range of 0.05 to 3.0 ml/g, preferably 0.1 to 2.0 ml/g.

EXAMPLES

The present invention will be hereinafter described in detail by the following examples, but it should be construed that the invention is in no way limited to those examples.

The content of protonic acid group, proton conductivity, water absorption at high temperature, and stability of protonic acid group were evaluated as follows.

<Content of Protonic Acid Group>

The proton conductive membrane obtained was washed with water until neutrality was reached in the washings. Thereafter, the residual free acids were removed sufficiently, and the membrane was dried. A given amount of the membrane was weighed out and was subjected to titration which employed phenolphthalein as indicator dissolved in a THF/water mixed solvent and a standard solution of NaOH. The content of protonic acid group (equivalent weight of sulfonic acid) was determined from the point of neutralization.

<Proton Conductivity>

A strip membrane specimen (40 mm×5 mm), holding 5 platinum wires (diameter: 0.5 mm) on its surface at intervals of 5 mm, was placed in a thermo-hygrostat (JW241 manufactured by Yamato Science Co., Ltd.). The alternating current impedance between the platinum wires was measured at 85° C., 90% RH and 10 kHz using a chemical impedance measuring system (NF Corporation) in each case where the interwire distance was from 5 mm to 20 mm among the 5 platinum wires. The resistivity R of the membrane was calculated by the following formula from a gradient between the interwire distance and the resistance. The proton conductivity was calculated from the reciprocal number of resistivity R.

$$\text{Resistivity } R(\Omega\cdot\text{cm}) = 0.5 \text{ (cm)} \times \text{membrane thickness (cm)} \times \text{resistance/interwire distance gradient}(\Omega/\text{cm})$$

<Water Absorption>

The proton conductive membrane obtained was humidity-conditioned at 25° C. and 50% RH for not less than 24 hours and was cut into 2.0 cm×3.0 cm. The pieces were weighed. Test pieces were thus prepared. The test pieces were placed in a 250-ml polycarbonate bottle, to which approximately 100 ml of distilled water was added, and the test pieces were humidified at 90° C. for 24 hours. After the completion of the test, the test pieces were taken out from the hot water and were lightly dried with Kimwipe. The test pieces containing water were weighed to determine the water absorption (%).

<Thermal Stability>

The proton conductive membrane obtained was cut into 2.0 cm×3.0 cm, and the pieces were weighed. Test pieces were thus prepared. The test pieces were wrapped in BEMCOT, were placed in a glass tube, and were heated at 160° C. for 100 hours using a compact thermostatic device. After the completion of the test, the content of protonic acid group was measured. The stability of protonic acid group was determined from the percentage (%) of the content of protonic acid group after heating to that before heating.

Example 1

(1) Synthesis of Oligomer (I)

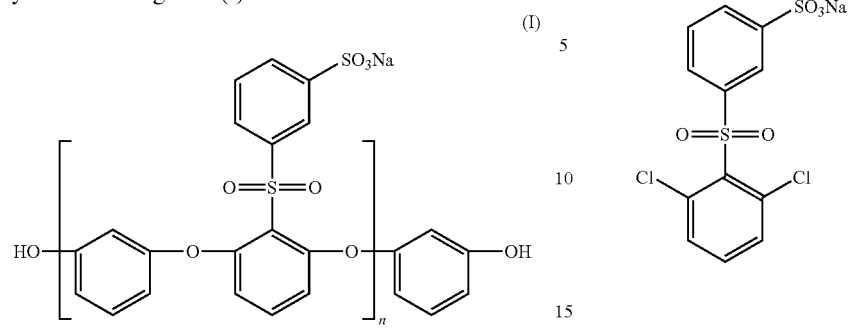

A 5-L three-necked flask equipped with a stirrer, a thermometer, a Dean-stark tube, a cooling tube and a nitrogen inlet tube, was charged with 309.3 g (0.795 mol) of monomer (II) represented by Formula (II) below, 100 g (0.908 mol) of resorcinol and 163 g (1.18 mol) of potassium carbonate. Further, 2300 ml and 1100 ml of sulfolane and toluene respectively were added, followed by heating to 100° C., and dehydration was performed while distilling away toluene. Subsequently, with the flask in an oil bath, the contents were heated at 130° C. under reflux in a nitrogen atmosphere. Reaction was carried out while byproduct water was formed into an azeotropic mixture with toluene and was removed outside the system. Water ceased to occur after about 3 hours. Thereafter, most of the toluene was removed while gradually raising the reaction temperature, and reaction was carried out at 190 to 200° C. for 10 hours. Subsequently, 12.5 g (0.114 mol) of resorcinol was added, and heating was carried out for another 4 hours. The reaction liquid was cooled to room temperature and was filtered through Celite to remove precipitated inorganic matters. The filtrate was poured into 10 L of methanol containing 1% concentrated hydrochloric acid to precipitate the product. The precipitated product was filtered off and was dried in vacuo to give 320 g of a crude product. The crude product was dissolved in 1 L of tetrahydrofuran and was reprecipitated in 4 L of methanol. The precipitated product was filtered off and was dried in vacuo to afford 290 g of oligomer (I) represented by Formula (I) above (87% yield). GPC provided that the oligomer (I) had a number-average molecular weight (Mn) and a weight-average molecular weight (Mw) of 8,000 and 12,000, respectively.

(2) Synthesis of Copolymer (III)

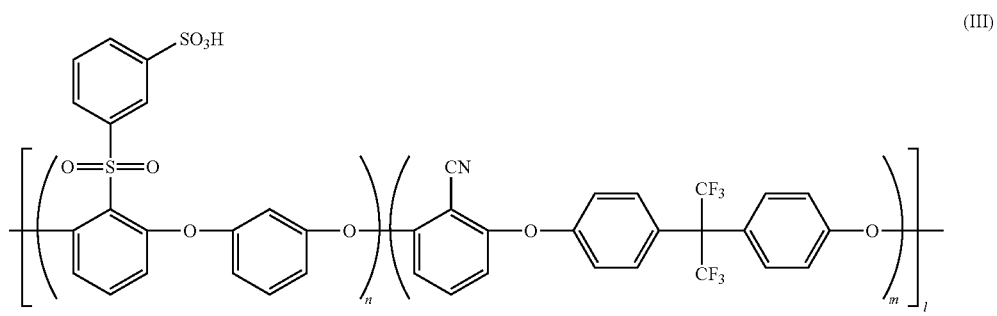

A 3-L three-necked flask equipped with a stirrer, a thermometer, a Dean-stark tube, a cooling tube and a nitrogen inlet tube, was charged with 200 g (0.025 mol) of the oligomer (I), 34.4 g (0.200 mol) of 2,6-dichlorobenzonitrile, 58.8 g (0.175 mol) of 2,2-bis(4-hydroxyphenyl)-1,1,1,3,3,3-hexafluoropropane (Bis-AF) and 34.6 g (0.25 mol) of potassium carbonate. Further, 1080 ml and 540 ml of sulfolane and toluene respectively were added, followed by heating to 100° C., and dehydration was performed while distilling away toluene. Subsequently, with the flask in an oil bath, the contents were heated at 130° C. under reflux in a nitrogen atmosphere. Reaction was carried out while byproduct water was formed into an azeotropic mixture with toluene and was removed outside the system. Water ceased to occur after about 3 hours. Thereafter, most of the toluene was removed while gradually raising the reaction temperature, and reaction was carried out at 190 to 200° C. for 10 hours. The reaction liquid was cooled to room temperature and was filtered through Celite to remove precipitated inorganic matters. The filtrate was poured into 10 L of methanol containing 1% concentrated hydrochloric acid to precipitate the product. The precipitated product was filtered off and was dried in vacuo to give 263 g of a crude product. The crude product was dissolved in 1 L of tetrahydrofuran and was reprecipitated in 4 L of methanol. The precipitated product was filtered off and was dried in vacuo. Thereafter, the product was added to 4 L of an aqueous 1M hydrochloric acid solution followed by stirring, and was then filtered off, and these operations were repeated three times. The resulting product was washed with pure water until the pH became not less than 5. The polymer obtained was dried in vacuo to afford 243 g of copolymer (III) represented by Formula (III) above (85% yield). GPC provided that the copolymer (III) had a number-average molecular weight (Mn) and a weight-average molecular weight (Mw) of 43,000 and 142,000, respectively.

A 14% by weight solution of the copolymer (III) in NMP was cast over a glass plate to produce a membrane, which was air dried and then vacuum dried. Thus, a proton conductive membrane 40 μm in dry thickness was obtained. The proton conductive membrane was evaluated for the content of protonic acid group, proton conductivity, water absorption and thermal stability. The results are shown in Table 1.

Example 2

(1) Synthesis of Oligomer (IV)

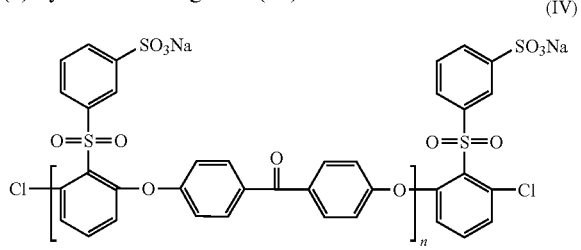

(IV)

A flask the same as that used in Example 1 was charged with 100 g (0.257 mol) of the monomer (II), 51.0 g (0.238 mol) of 4,4'-dihydroxybenzophenone and 48.9 g (0.354 mol) of potassium carbonate. Further, 900 ml and 400 ml of sulfolane and toluene respectively were added, and reaction was carried out under the same conditions as in Example 1, except that 12.5 g (0.032 mol) of the monomer (II) was additionally added after 13 hours. Consequently, 105 g of oligomer (IV) represented by Formula (IV) above was obtained (85% yield). GPC provided that the oligomer (IV) had Mn and Mw of 8,800 and 12,400, respectively.

(2) Synthesis of Copolymer (V)

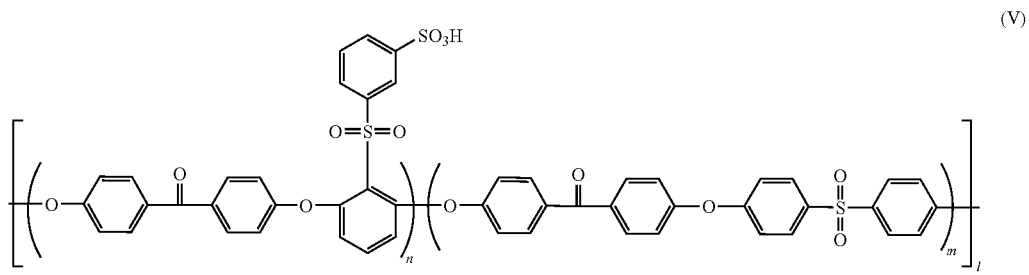

(V)

The procedure of Example 1 was repeated except using 200 g (0.023 mol) of the oligomer (IV), 19.6 g (0.068 mol) of bis(4-chlorophenyl)sulfone, 19.5 g (0.091 mol) of 4,4'-dihydroxybenzophenone, and 26.3 g (0.19 mol) of potassium carbonate. Consequently, 214 g of copolymer (V) represented by Formula (V) above was obtained (80% yield). GPC provided that the copolymer (V) had Mn and Mw of 51,000 and 152,000, respectively.

A 14% by weight solution of the copolymer (V) in NMP was cast over a glass plate to produce a membrane, which was air dried and then vacuum dried. Thus, a proton conductive membrane 40 μm in dry thickness was obtained. The proton conductive membrane was evaluated for the content of protonic acid group, proton conductivity, water absorption and thermal stability. The results are shown in Table 1.

Example 3

(1) Synthesis of Oligomer (VI)

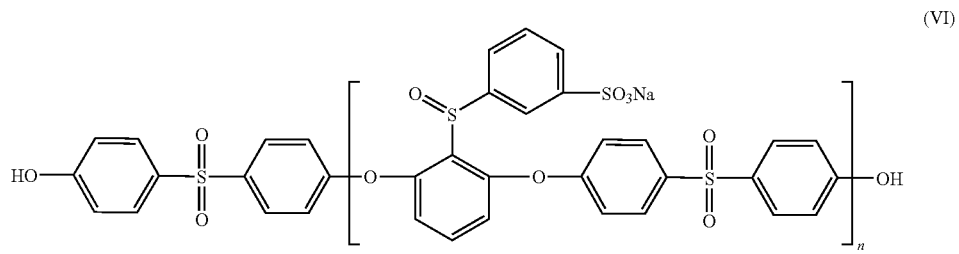

(VI)

The procedure of Example 1 was repeated except using 121.8 g (0.350 mol) of monomer (VII) represented by Formula (VII) below in place of the monomer (II); 100 g (0.400 mmol) of 4,4'-dihydroxydiphenylsulfone in place of resorcinol; 71.8 g (0.519 mol) of potassium carbonate; 1200 ml of sulfolane; 600 ml of toluene; and 12.5 g (0.0499 mol) of additional 4,4'-dihydroxydiphenylsulfone in place of additional resorcinol. Consequently, 158 g of oligomer (VI) represented by Formula (VI) above was obtained (83% yield). GPC provided that the oligomer (VI) had Mn and Mw of 8,200 and 14,000, respectively.

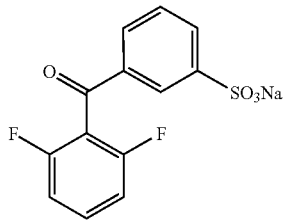

(VII)

(2) Synthesis of Copolymer (VIII)

The procedure of Example 1 was repeated except using 200 g (0.024 mol) of the oligomer (VI) in place of the oligomer (I); 18.4 g (0.073 mol) of 4,4'-dichlorobenzophenone in place of 2,6-dichlorobenzonitrile; 5.4 g (0.049 mol) of resorcinol in place of Bis-AF; and 13.1 g (0.095 mol) of potassium carbonate. Consequently, 195 g of copolymer (VIII) represented by Formula (VIII) above was obtained (68% yield) GPC provided that the copolymer (VIII) had Mn and Mw of 44,000 and 140,000, respectively.

A 14% by weight solution of the copolymer (VIII) in NMP was cast over a glass plate to produce a membrane, which was air dried and then vacuum dried. Thus, a proton conductive membrane 40 μm in dry thickness was obtained. The proton conductive membrane was evaluated for the content of protonic acid group, proton conductivity, water absorption and thermal stability. The results are shown in Table 1.

Example 4

(1) Synthesis of Oligomer (IX)

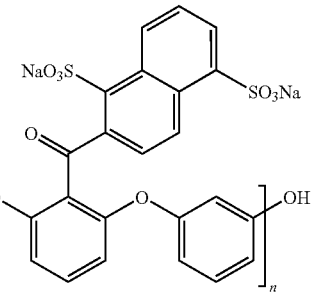

(IX)

The procedure of Example 1 was repeated except using 120 g (0.238 mol) of monomer (X) represented by Formula (X) below in place of the monomer (II); 29.9 g (0.271 mmol) of resorcinol; 54.9 g (0.397 mol) of potassium carbonate; 1100 ml of sulfolane; 600 ml of toluene; and 3.74 g (0.0340 mol) of additional resorcinol. Consequently, 150 g of oligomer (IX) represented by Formula (IX) above was obtained (75% yield).

(VIII)

GPC provided that the oligomer (IX) had Mn and Mw of 9,100 and 16,500, respectively.

(X)

(2) Synthesis of Oligomer (XI)

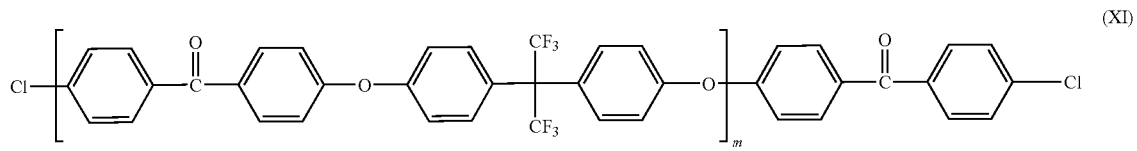

A 5-L three-necked flask equipped with a stirrer, a thermometer, a Dean-stark tube, a cooling tube and a nitrogen inlet tube, was charged with 228.0 g (0.908 mol) of 4,4'-dichlorobenzophenone, 267.4 g (0.795 mol) of Bis-AF and 163 g (1.18 mol) of potassium carbonate. Further, 2300 ml and 1100 ml of sulfolane and toluene respectively were added, followed by heating to 100° C., and dehydration was performed while distilling away toluene. Subsequently, with the flask in an oil bath, the contents were heated at 130° C. under reflux in a nitrogen atmosphere. Reaction was carried out while byproduct water was formed into an azeotropic mixture with toluene and was removed outside the system. Water ceased to occur after about 3 hours. Thereafter, most of the toluene was removed while gradually raising the reaction temperature, and reaction was carried out at 190 to 200° C. for 10 hours. Subsequently, 28.6 g (0.114 mol) of 4,4'-dichlorobenzophenone was added, and heating was carried out for another 4 hours. The reaction liquid was cooled to room temperature and was filtered through Celite to remove precipitated inorganic matters. The filtrate was poured into 10 L of methanol containing 1% concentrated hydrochloric acid to precipitate the product. The precipitated product was filtered off and was dried in vacuo to give 320 g of a crude product. The crude product was dissolved in 1 L of tetrahydrofuran and was reprecipitated in 4 L of methanol. The precipitated product was filtered off and was dried in vacuo to afford 381 g of oligomer (XI) represented by Formula (XI) above (87% yield) GPC provided that the oligomer (XI) had Mn and Mw of 7,000 and 10,500, respectively.

(3) Synthesis of Copolymer (XII)

A 3-L three-necked flask equipped with a stirrer, a thermometer, a Dean-stark tube, a cooling tube and a nitrogen inlet tube, was charged with 182 g (0.02 mol) of the oligomer (IX), 140 g (0.02 mol) of the oligomer (XI), and 5.5 g (0.04 mol) of potassium carbonate. Further, 1080 ml and 540 ml of sulfolane and toluene respectively were added, followed by heating to 100° C., and dehydration was performed while distilling away toluene. Subsequently, with the flask in an oil bath, the contents were heated at 130° C. under reflux in a nitrogen atmosphere. Reaction was carried out while byproduct water was formed into an azeotropic mixture with toluene and was removed outside the system. Water ceased to occur after about 5 hours. Thereafter, most of the toluene was removed while gradually raising the reaction temperature, and reaction was carried out at 190 to 200° C. for 12 hours. The reaction liquid was cooled to room temperature and was filtered through Celite to remove precipitated inorganic matters. The filtrate was poured into 10 L of methanol containing 1% concentrated hydrochloric acid to precipitate the product. The precipitated product was filtered off and was dried in vacuo to give a crude product. The crude product was dissolved in 1 L of tetrahydrofuran and was reprecipitated in 4 L of methanol. The precipitated product was filtered off and was dried in vacuo. Thereafter, the product was added to 4 L of an aqueous 1M hydrochloric acid solution followed by stirring, and was then filtered off, and these operations were repeated three times. The resulting product was washed with pure water until the pH became not less than 5. The polymer obtained was dried in vacuo to afford 262 g of copolymer (XII) represented by Formula (XII) above (82% yield). GPC provided that the copolymer (XII) had Mn and Mw of 43,000 and 142,000, respectively.

A 14% by weight solution of the copolymer (XII) in NMP was cast over a glass plate to produce a membrane, which was air dried and then vacuum dried. Thus, a proton conductive

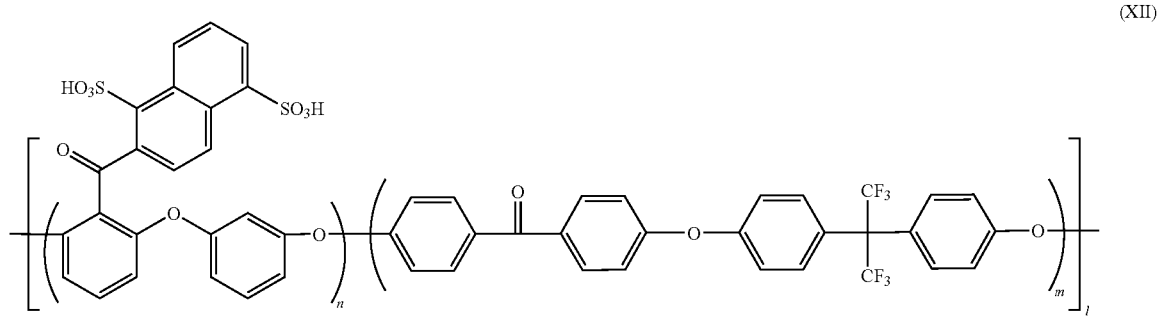

membrane 40 μm in dry thickness was obtained. The proton conductive membrane was evaluated for the content of protonic acid group, proton conductivity, water absorption and thermal stability. The results are shown in Table 1.

Example 5

(1) Synthesis of Oligomer (XIII)

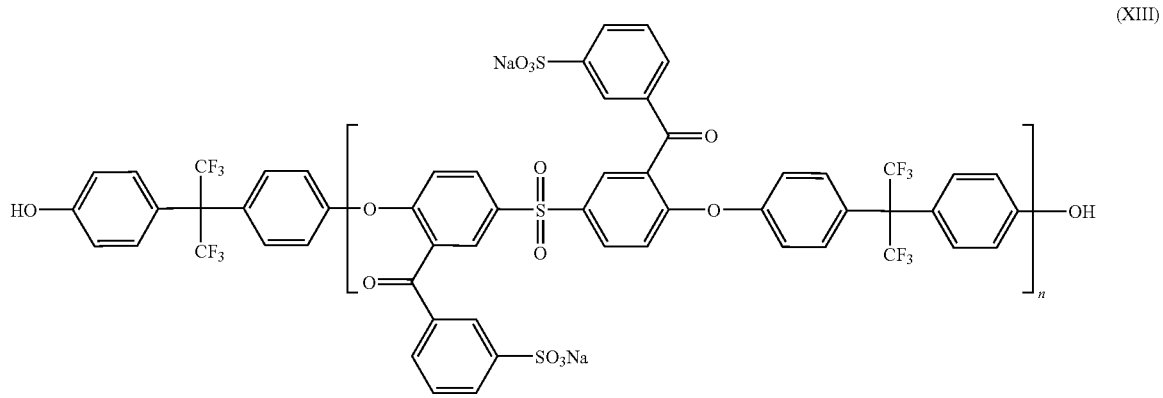

The procedure of Example 1 was repeated except using 171 g (0.260 mol) of monomer (XIV) represented by Formula (XIV) below in place of the monomer (II); 100 g (0.297 mmol) of Bis-AF in place of resorcinol; 53.4 g (0.387 mol) of potassium carbonate; 1400 ml of sulfolane; 700 ml of toluene; and 12.5 g (0.0372 mol) of additional Bis-AF in place of additional resorcinol. Consequently, 213 g of oligomer (XIII) represented by Formula (XIII) above was obtained (85% yield) GPC provided that the oligomer (XIII) had Mn and Mw of 7,900 and 143,000, respectively.

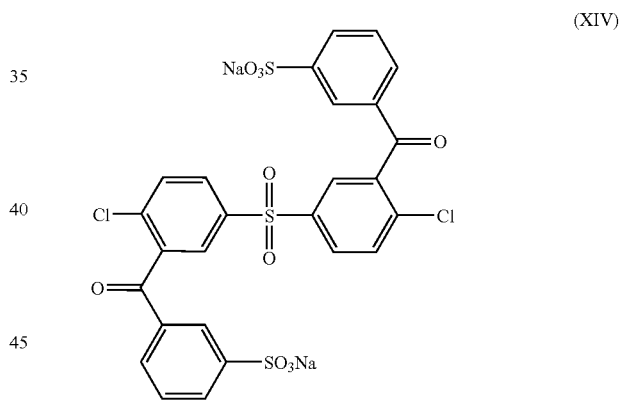

(2) Synthesis of Copolymer (XV)

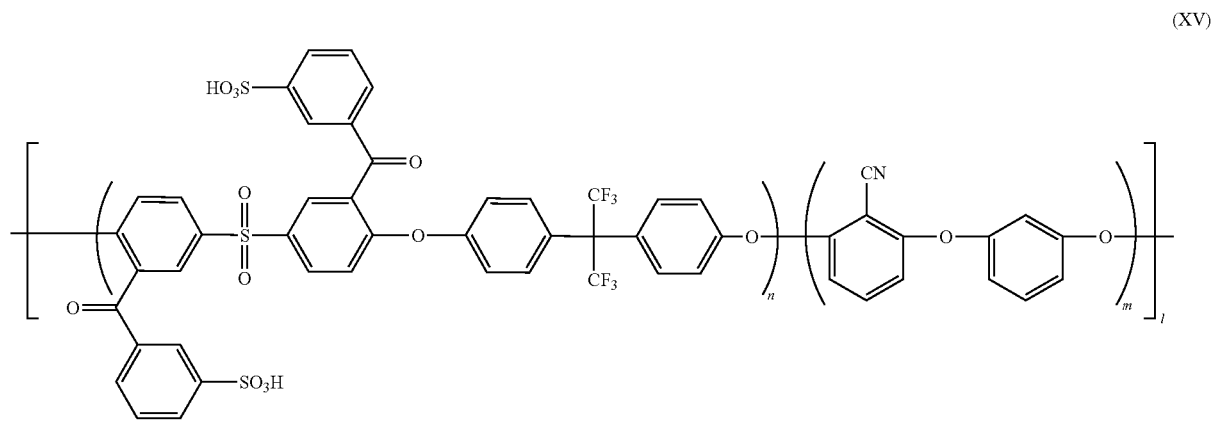

The procedure of Example 1 was repeated except using 200 g (0.025 mol) of the oligomer (XIII) in place of the oligomer (I); 34.8 g (0.203 mol) of 2,6-dichlorobenzonitrile; 19.6 g (0.178 mol) of resorcinol in place of Bis-AF; and 35.0 g (0.253 mol) of potassium carbonate. Consequently, 198 g of copolymer (XV) represented by Formula (XV) above was obtained (82% yield) GPC provided that the copolymer (XV) had Mn and Mw of 38,000 and 135,000, respectively.

A 14% by weight solution of the copolymer (XV) in NMP was cast over a glass plate to produce a membrane, which was air dried and then vacuum dried. Thus, a proton conductive membrane 40 μm in dry thickness was obtained. The proton conductive membrane was evaluated for the content of protonic acid group, proton conductivity, water absorption and thermal stability. The results are shown in Table 1.

Comparative Example 1

Synthesis of Sulfonated Polyether Ether Ketone 3.0 Grams of polyether ether ketone (PEEK) manufactured by Victrex Inc. was dissolved in 150 ml of concentrated sulfuric acid, and reaction was carried out with stirring at 50° C. for 24 hours. The mixture obtained was poured into a large excess of deionized water to precipitate a sulfonated polymer. The precipitated polymer was filtered off and was washed with deionized water until the pH of the washings became neutral, followed by drying. Thus, sulfonated polyether ether ketone was synthesized.

A 15% by weight solution of the sulfonated polyether ether ketone in NMP was cast over a glass plate to produce a membrane, which was air dried and then vacuum dried. Thus, a proton conductive membrane 40 μm in dry thickness was obtained. The proton conductive membrane was evaluated for the content of protonic acid group, proton conductivity, water absorption and thermal stability. The results are shown in Table 1.

TABLE 1

|  | Protonic acid group content (meq/g) | Proton conductivity (Ω/cm) | Water absorption (%) | Thermal stability (%) |
|---|---|---|---|---|
| Ex. 1 | 1.8 | 0.21 | 72 | 95 |
| Ex. 2 | 1.7 | 0.19 | 73 | 96 |
| Ex. 3 | 1.7 | 0.19 | 76 | 95 |
| Ex. 4 | 1.9 | 0.23 | 70 | 94 |
| Ex. 5 | 1.8 | 0.20 | 72 | 96 |
| Comp. Ex. 1 | 2.2 | 0.22 | 720 | 80 |

The invention claimed is:

1. A polymer electrolyte, which comprises a copolymer comprising constituent units with a protonic acid group represented by Formula (1) below and constituent units without a protonic acid group represented by Formula (6) below:

wherein $Ar^1$ is a binding unit represented by Formula (2) below; $Ar^2$ is a binding unit represented by Formula (3) below; and Y is an oxygen or a sulfur atom;

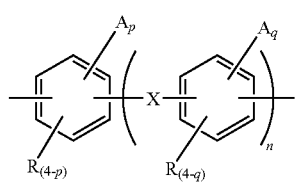

wherein X is a divalent electron-withdrawing group; n is an integer of from 0 to 4; p and q are each an integer of from 0 to 4 (with the proviso that p+q≧1); Rs are each a hydrogen atom, a fluorine atom, an alkyl group, a fluorine-substituted alkyl group, an aryl group or a nitrile group; and As are each a group represented by Formula (5a) or (5b) below;

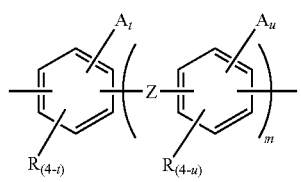

wherein Z is a direct bond, —O—, —S—, —CO—, —SO$_2$—, —[C(R')$_2$]$_g$— (wherein R' is a hydrogen atom, a fluorine atom, an alkyl group, a fluorine-substituted alkyl group or an aryl group, and g is an integer of from 1 to 8) or a binding unit represented by any of Formulae (4a) to (4d) below; m is an integer of from 0 to 4; t and u are each an integer of from 0 to 4; and Rs and As are as defined in Formula (2);

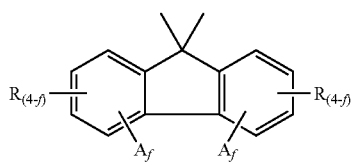

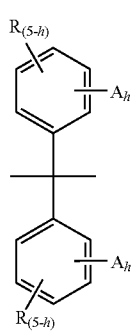

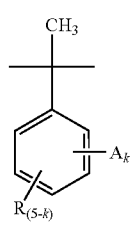

-continued (4d)

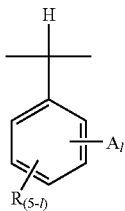

wherein f is an integer of from 0 to 4; h, k and l are each an integer of from 0 to 5; and Rs and As are as defined in Formula (2);

(5a)

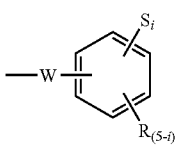

(5b)

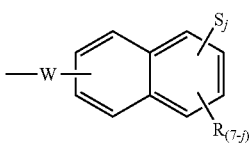

wherein W is a divalent electron-withdrawing group; S is a protonic acid group; i is an integer of from 1 to 5; j is an integer of from 1 to 7; and Rs are as defined in Formula (2);

$$-(Ar^3-Y-Ar^4-Y)-\quad(6)$$

wherein $Ar^3$ is a binding unit represented by Formula (7) below; $Ar^4$ is a binding unit represented by Formula (8) below; and Y is an oxygen or a sulfur atom;

(7)

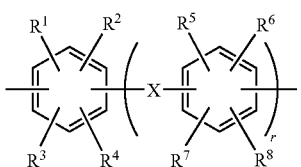

wherein X is a divalent electron-withdrawing group; r is an integer of from 0 to 4; and $R^1$ to $R^8$ are the same or different from one another and are each a hydrogen atom, a fluorine atom, an alkyl group, a fluorine-substituted alkyl group, an aryl group or a nitrile group;

(8)

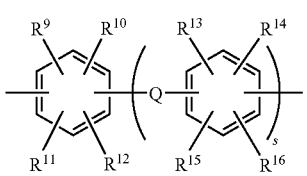

wherein Q is a direct bond, —O—, —S—, —CO—, —SO$_2$—, —[C(R')$_2$]$_g$— (wherein R' is a hydrogen atom, a fluorine atom, an alkyl group, a fluorine-substituted alkyl group or an aryl group, and g is an integer of from 1 to 8) or a binding unit represented by any of Formulae (9a) to (9d) below; s is an integer of from 0 to 4; and $R^9$ to $R^{16}$ are the same or different from one another and are each a hydrogen atom, a fluorine atom, an alkyl group, a fluorine-substituted alkyl group, an aryl group or a nitrile group;

(9a)

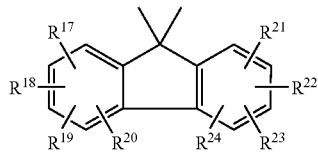

(9b)

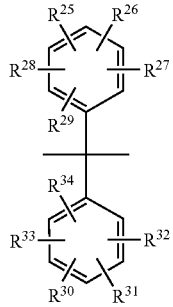

(9c)

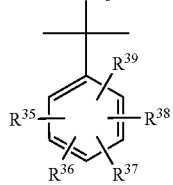

(9d)

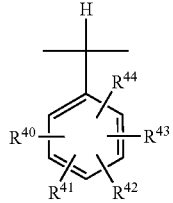

wherein $R^{17}$ to $R^{44}$ are the same or different from one another and are each a hydrogen atom, a fluorine atom, an alkyl group, a fluorine-substituted alkyl group, an aryl group or a nitrile group.

2. The polymer electrolyte according to claim 1, wherein the copolymer is a block copolymer that comprises at least one each of a block which comprises the constituent units with a protonic acid group represented by Formula (1) and a block which comprises the constituent units without a protonic acid group represented by Formula (6).

3. The polymer electrolyte according to claim 1, wherein X in Formulae (2) and (7) is —CO—, —SO$_2$— or —[C(R")$_2$]$_g$—, and W in Formulae (5a) and (5b) is —CO—, —SO$_2$— or —[C(R")$_2$]$_g$— (wherein R" is a fluorine atom or a fluorine-substituted alkyl group, and g is an integer of from 1 to 8).

4. The polymer electrolyte according to claim 1, wherein the constituent unit represented by Formula (1) is represented by any of Formulae (18) to (21) below:

(18)
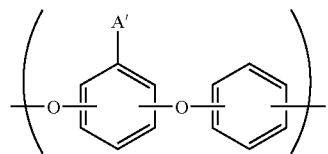

(19)
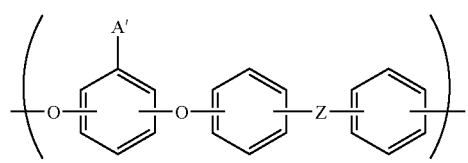

(20)
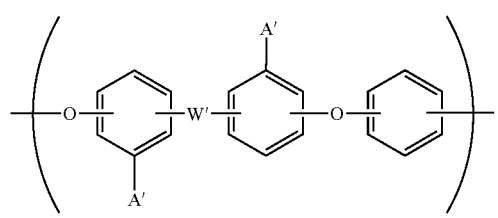

(21)
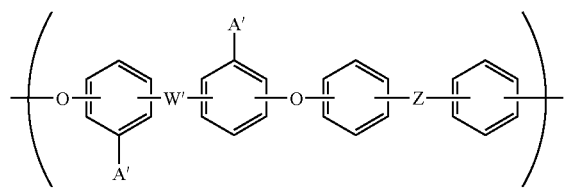

wherein W' is —CO— or —SO$_2$—; A' is a group represented by any of Formulae (22a) to (22c) below;

(22a)
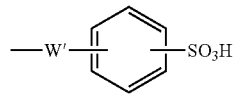

(22b)
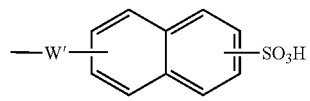

-continued (22c)
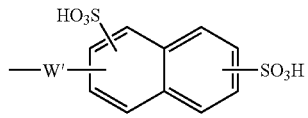

wherein W' is —CO— or —SO$_2$—.

5. The polymer electrolyte according to claim 1, wherein the constituent unit represented by Formula (6) is represented by any of Formulae (10) to (12) below:

(10)
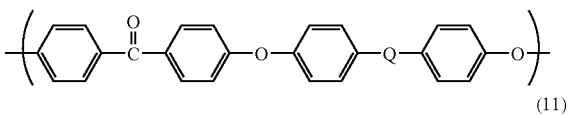

(11)
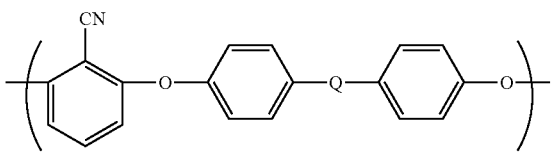

(12)

wherein Q is as defined in Formula (8).

6. A proton conductive membrane comprising the polymer electrolyte of claim 1.

7. An electrode electrolyte comprising the polymer electrolyte of claim 1.

8. An electrode paste comprising the electrode electrolyte of claim 7, catalyst-supporting carbon and a solvent.

9. A membrane-electrode assembly comprising a proton conductive membrane and electrode layers, the proton conductive membrane and/or electrode layers comprising the polymer electrolyte of claim 1.

* * * * *

UNITED STATES PATENT AND TRADEMARK OFFICE
CERTIFICATE OF CORRECTION

PATENT NO. : 7,651,802 B2
APPLICATION NO. : 11/375141
DATED : January 26, 2010
INVENTOR(S) : Yamakawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 887 days.

Signed and Sealed this

Twenty-third Day of November, 2010

David J. Kappos
*Director of the United States Patent and Trademark Office*